United States Patent
Faccin

(10) Patent No.: US 10,814,762 B2
(45) Date of Patent: Oct. 27, 2020

(54) APPARATUS WITH INCLINATION-ADJUSTABLE PIVOTING ELEMENT, IN PARTICULAR, A VEHICLE ARMREST

(71) Applicant: CLERPREM S.p.A., Carrè (IT)

(72) Inventor: Francesco Faccin, Carreè (IT)

(73) Assignee: CLERPREM S.P.A. (IT)

( * ) Notice: Subject to any disclaimer, the term of this patent is extended or adjusted under 35 U.S.C. 154(b) by 0 days.

(21) Appl. No.: 16/534,042

(22) Filed: Aug. 7, 2019

(65) Prior Publication Data
US 2020/0047651 A1 Feb. 13, 2020

(30) Foreign Application Priority Data

Aug. 7, 2018 (EP) .................................... 18425065

(51) Int. Cl.
*B60N 2/75* (2018.01)
(52) U.S. Cl.
CPC .................................... *B60N 2/767* (2018.02)
(58) Field of Classification Search
CPC ...................................................... B60N 2/767
See application file for complete search history.

(56) References Cited

U.S. PATENT DOCUMENTS

| | | | | |
|---|---|---|---|---|
| 4,311,338 A | * | 1/1982 | Moorhouse | B60N 2/77 297/411.36 |
| 4,496,190 A | * | 1/1985 | Barley | B60N 2/767 297/411.38 |
| 5,984,416 A | | 11/1999 | Waldo et al. | |
| 9,758,074 B1 | | 9/2017 | Lin et al. | |
| 2008/0296954 A1 | | 12/2008 | Liu et al. | |
| 2019/0210499 A1 | * | 7/2019 | Boddenberg | B60N 2/767 |

FOREIGN PATENT DOCUMENTS

| | | |
|---|---|---|
| DE | 4227871 | 2/1994 |
| FR | 2789142 | 8/2000 |

OTHER PUBLICATIONS

European Search Report for EP18425065.2, dated Feb. 18, 2019. (8 pages).

* cited by examiner

*Primary Examiner* — Anthony D Barfield
(74) *Attorney, Agent, or Firm* — McAndrews, Held & Malloy, Ltd.

(57) ABSTRACT

The invention concerns an apparatus with inclination-adjustable pivoting element, a pivoting element, hinged on a support structure around a first axis of rotation to move between a first limit stop position and a second limit stop position. The apparatus comprises at least one abutment body, rotationally connected to the pivoting body and to the structure around the first axis and constrainable in rotation to the pivoting element. The abutment body stops the pivoting element in the first limit stop position by abutting against a first stop. The apparatus comprises: at least one body of constraint between the abutment body and the pivoting element, which may assume alternatively a constraint and a release configuration; and a control device, kinematically connected to the constraint body to move it between the two aforesaid positions. The inclination in the first limit stop position is adjusted by activating the control device and varying the inclination of the pivoting element.

20 Claims, 16 Drawing Sheets

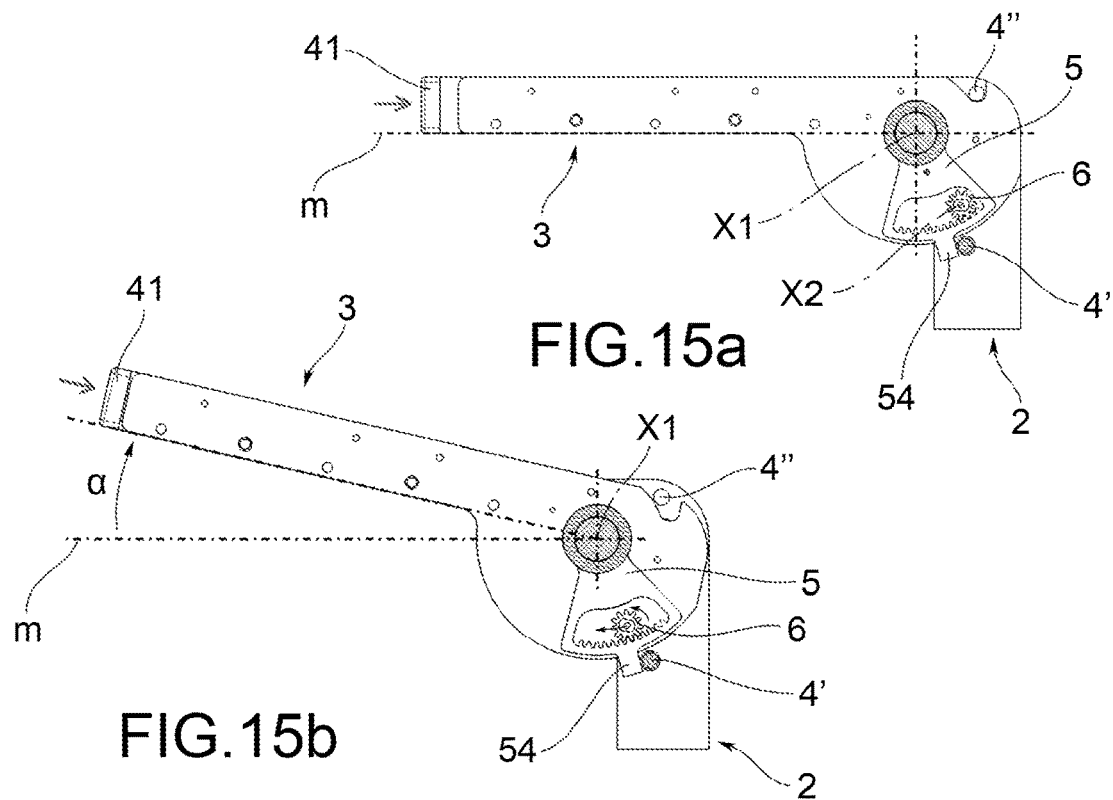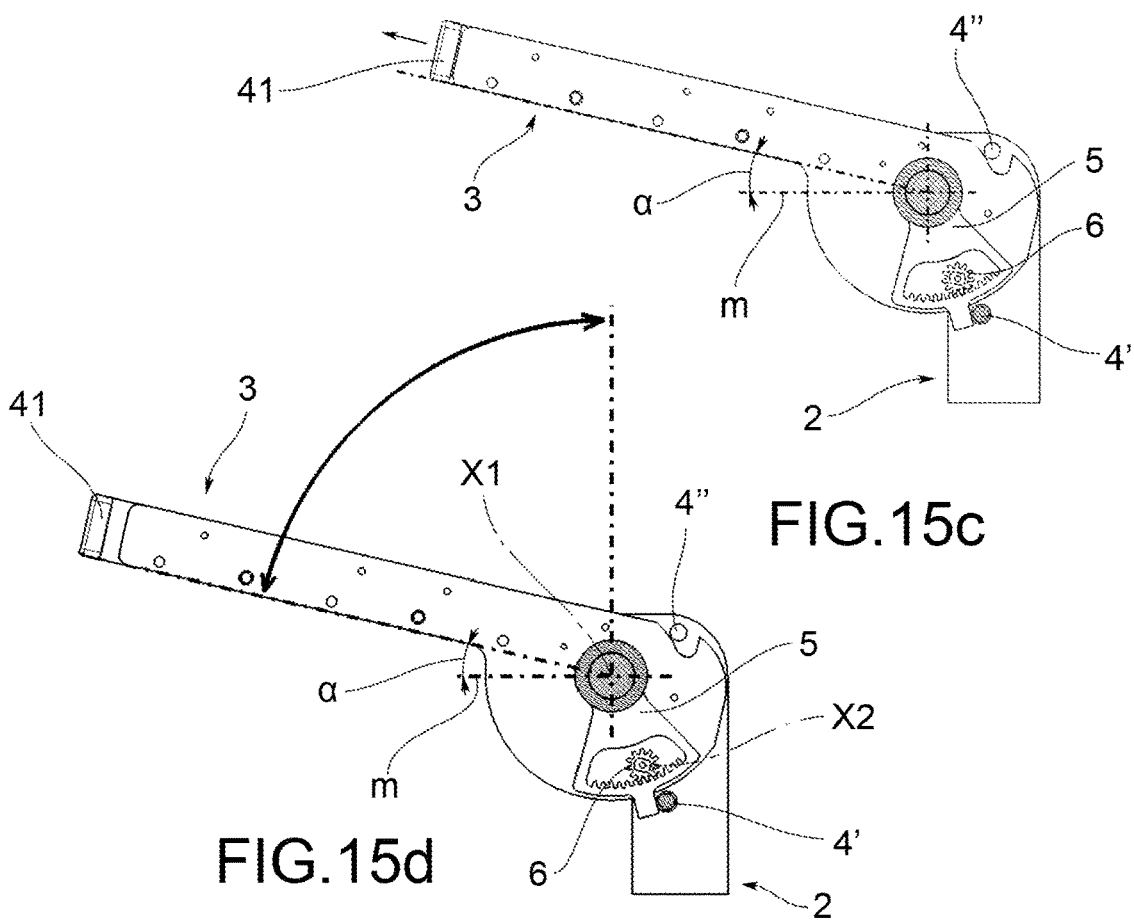

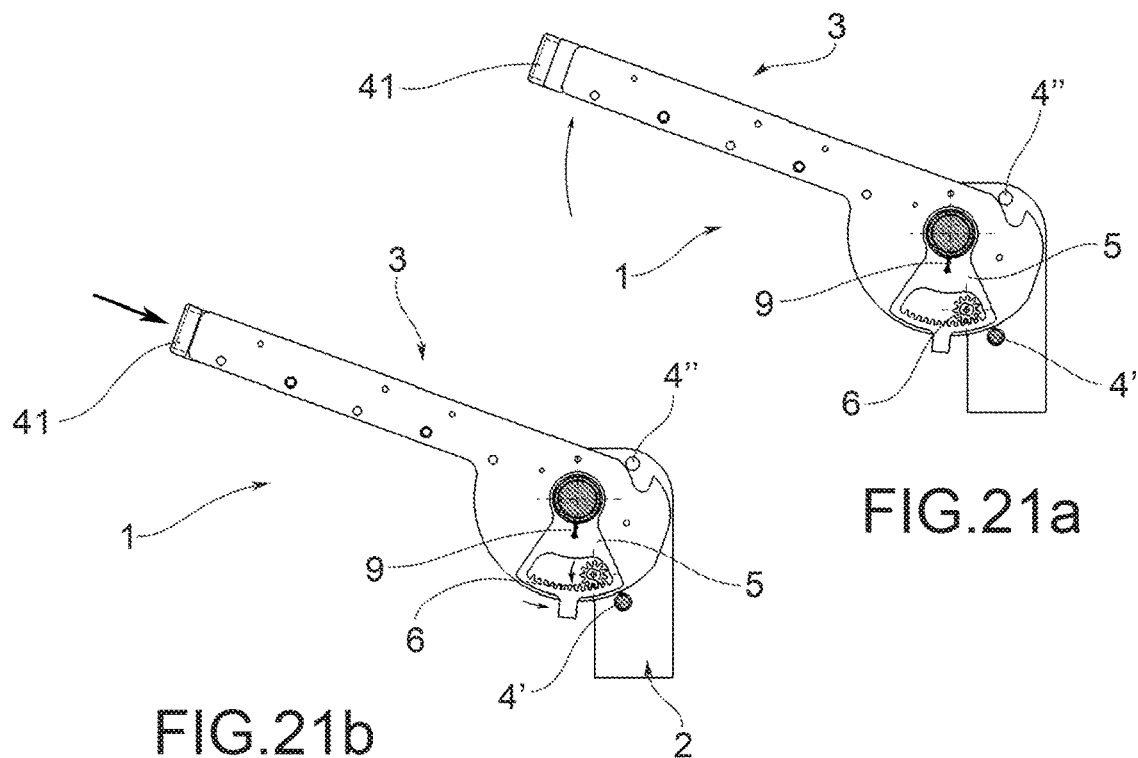
FIG.21a
FIG.21b
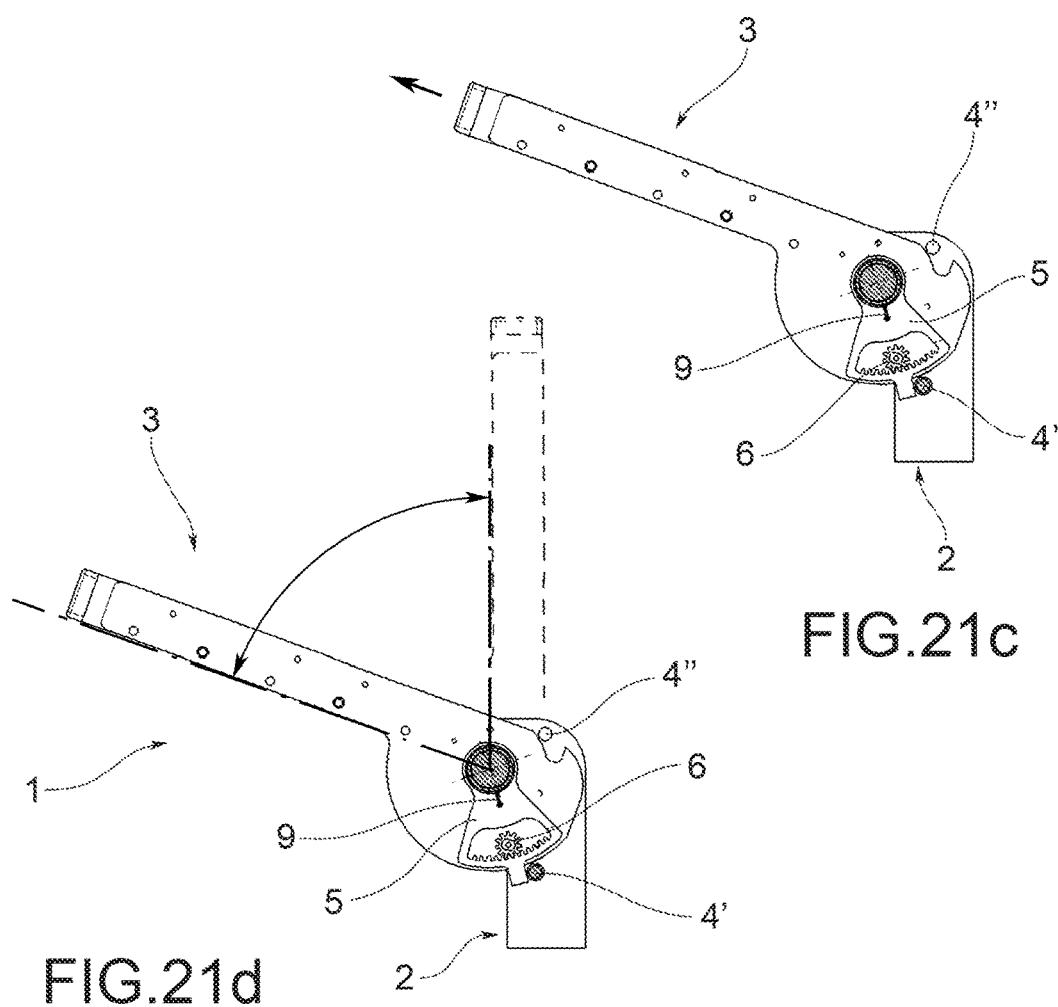
FIG.21c
FIG.21d

APPARATUS WITH INCLINATION-ADJUSTABLE PIVOTING ELEMENT, IN PARTICULAR, A VEHICLE ARMREST

This application claims priority under 35 U.S.C. 119 to European Application No. 18425065.2, filed Aug. 7, 2018, the entirety of which is incorporated by reference herein.

FIELD OF THE INVENTION

The object of the present invention is an apparatus with inclination-adjustable pivoting element.

In particular, the apparatus with pivoting element may be an armrest of a vehicle, for example a motor vehicle. The apparatus according to the invention may also be a seat, a backrest, a footrest, a table with an adjustable support surface or other.

BACKGROUND

Apparatuses are known with a pivoting element, which may be locked at different inclinations; in such apparatuses the inclination may be adjusted by means of an adjustment system operated by the user. In particular, armrests for vehicles equipped with a system for adjusting the angle of the movable part of the armrest are well known.

Very common apparatuses are known which use a ratchet adjustment system or freewheel bearings. Such systems, while fully fulfilling their function, do not allow the automatic return of the pivoting element to a certain selected position. In fact, every time the pivoting element is moved from a selected position, all the adjustments must be repeated to return it thereto. This is not immediate and in any case does not guarantee the desired result in a quick and simple way.

There is, therefore, a need, particularly in the automotive field, with specific reference to armrests for vehicles, to have apparatuses with a pivoting element equipped with a system for automatically resetting a pre-selected adjustment position of the pivoting element.

Such need is currently met by electromechanical systems that provide for the use of electric motors and electronic control systems. These systems completely fulfill their function but have high implementation costs.

SUMMARY OF THE INVENTION

Thus, one object of the present invention is to eliminate the drawbacks of the aforementioned prior art, providing an apparatus with inclination-adjustable pivoting element that allows one to automatically reset a pre-selected position of the pivoting element without using electromechanical devices.

A further object of the present invention is to provide an apparatus with inclination-adjustable pivoting element that allows a continuous adjustment of the angle of the first limit stop position.

A further object of the present invention is to provide an apparatus with inclination-adjustable pivoting element that is mechanically simple and at the same time quick and simple to use.

A further object of the present invention is to provide an apparatus with an adjustable pivoting element that is easy and economical to implement.

BRIEF DESCRIPTION OF THE DRAWINGS

The technical features of the invention, according to the aforesaid objects, are clearly apparent from the content of the claims provided hereinafter and the advantages thereof will become more apparent in the following detailed description, made with reference to the accompanying drawings, which represent one or more purely exemplifying and non-limiting embodiments, wherein:

FIGS. 15a to 15d show in sequence, for the apparatus of FIG. 1, the adjustment of the inclination from the first limit stop position;

FIGS. 16a to 16c show in sequence, for the apparatus of FIG. 1, the steps to bring the first limit stop back to the minimum inclination shown in FIG. 14a;

FIGS. 21a to 21d show in sequence, for the apparatus of FIG. 17, the adjustment of the inclination from the first limit stop position;

DETAILED DESCRIPTION

With reference to the accompanying drawings, an apparatus with inclination-adjustable pivoting element according to the invention has been indicated collectively with 1.

In particular, the apparatus with a pivoting element according to the invention may be an armrest of a vehicle, for example a motor vehicle, as illustrated in the accompanying drawings. For the sake of simplicity, the description below will therefore be made by referring to a motor vehicle armrest and in this sense the terms "armrest" and "apparatus" are used in an equivalent way. This does not mean that the apparatus 1, according to the invention, may not also be different from an armrest, but rather may be, for example, a seat, a backrest, a footrest, a table with an adjustable support surface or other.

Here and in the description and claims that follow, reference will be made to the apparatus or armrest 1 in the condition of use. It is therefore in this sense that references to a lower or upper position are to be understood.

Figure 5:
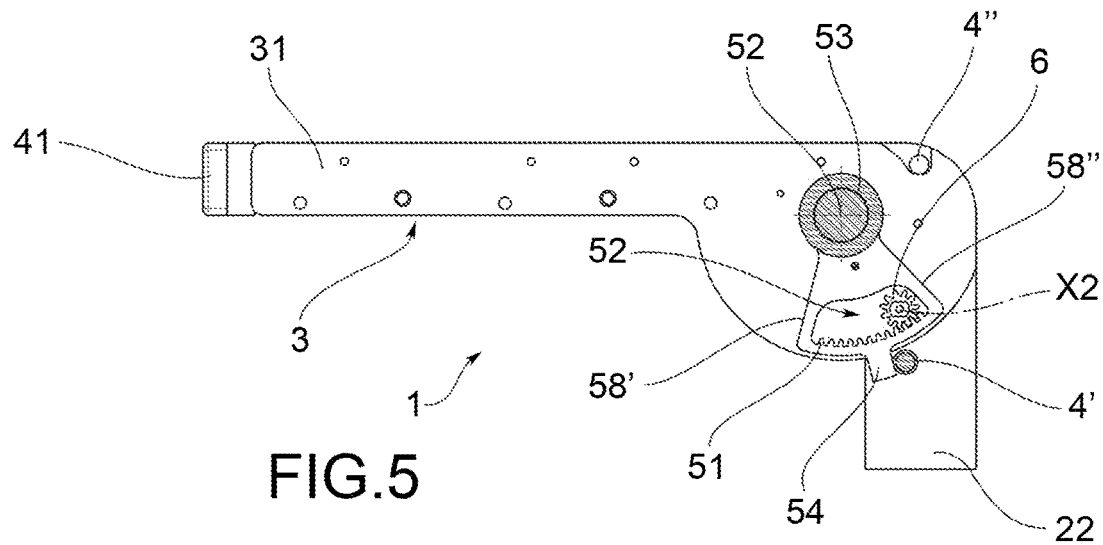
FIGS. 5 and 6 show two side views in cross-section of the apparatus of FIG. 1, respectively according to the plane indicated by the arrows V-V and according to the plane indicated by the arrows VI-VI provided therein.
Figure 6:
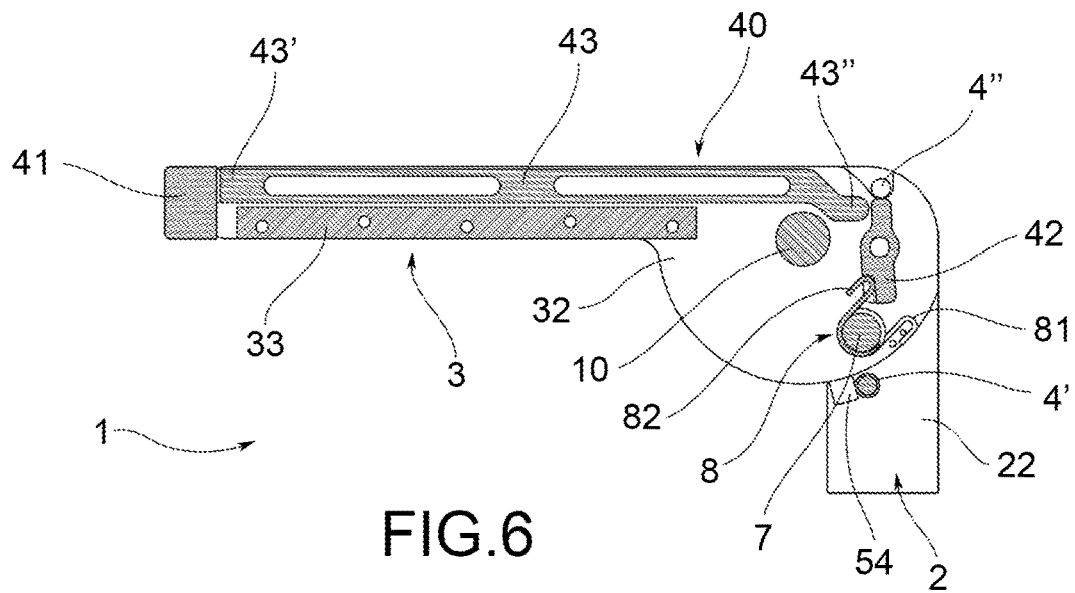
Figure 7:
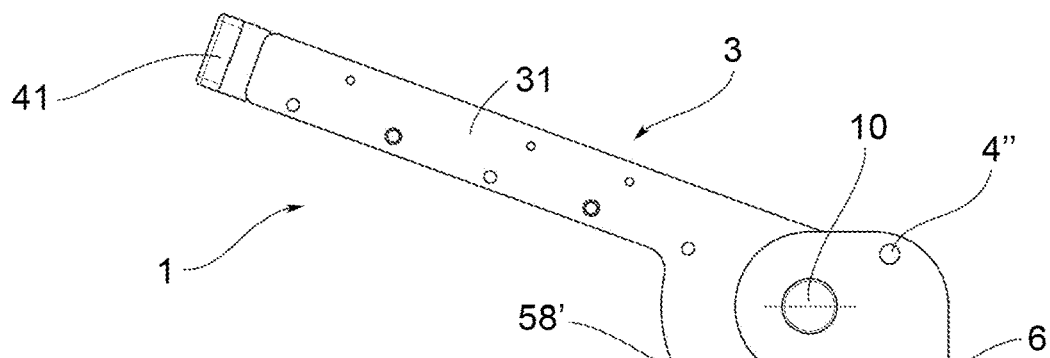
FIG. 7 shows a side view of the apparatus of FIG. 1 with the pivoting element displaced with respect to the limit stop position.
Figure 8:
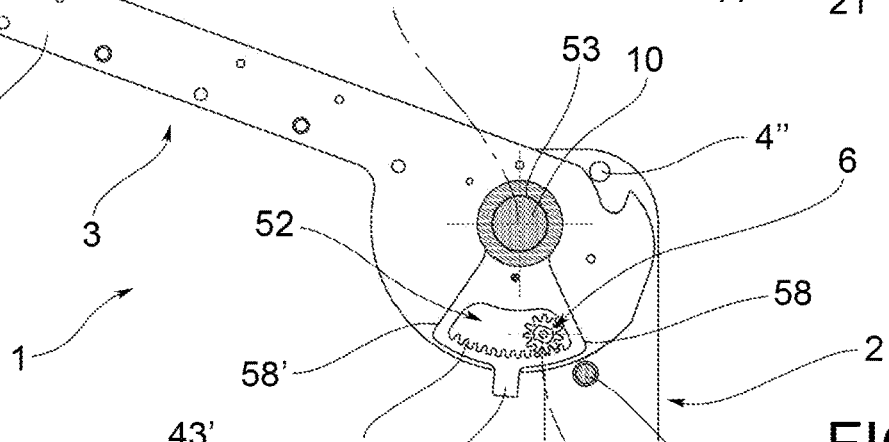
FIGS. 8 and 9 show two side views in cross-section of the apparatus of FIG. 7, respectively according to the planes V-V and VI-VI indicated in FIG. 4.
Figure 11:
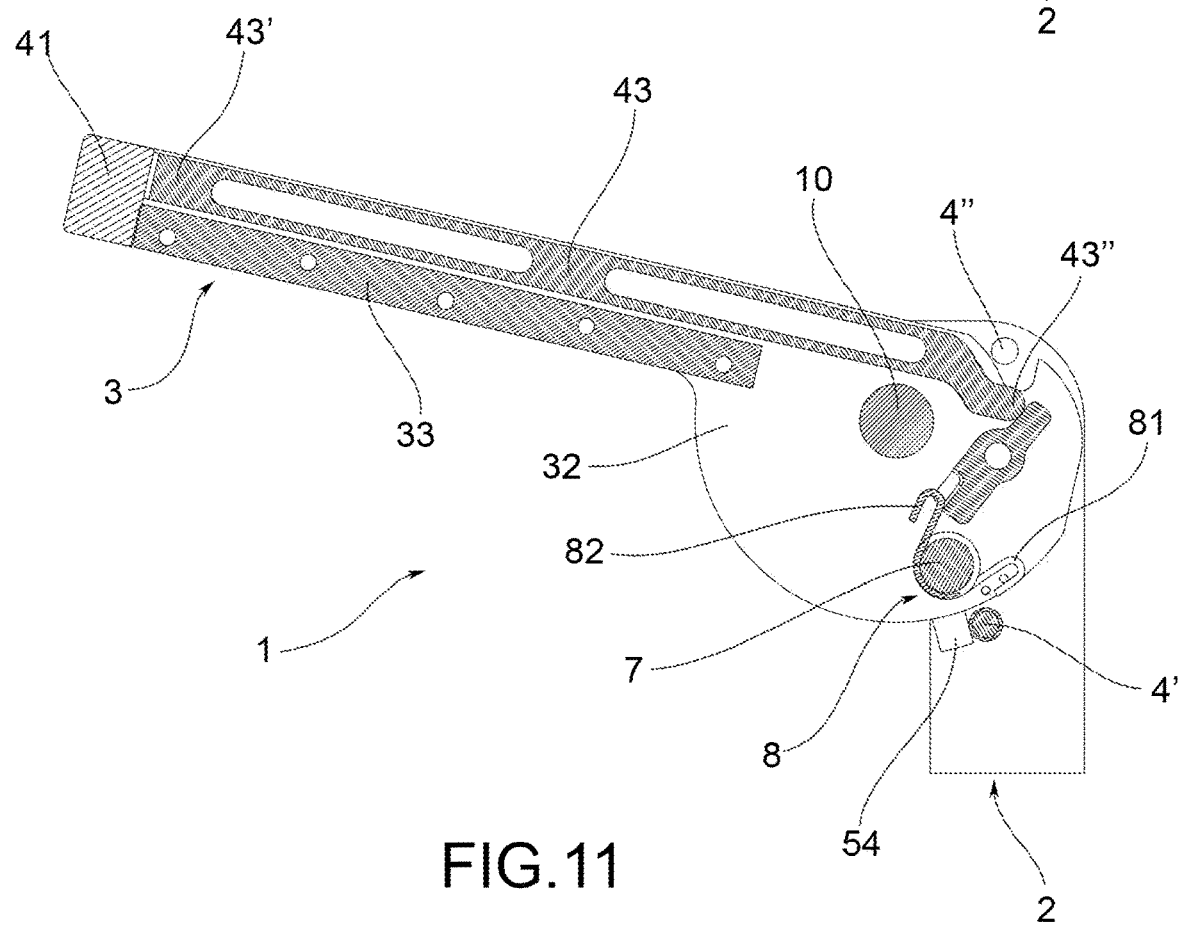

In accordance with a general embodiment of the invention, the apparatus or armrest 1 comprises a support structure 2 and a pivoting element 3, hinged to the support structure around a first axis of rotation X1 to move between a first limit stop position and a second limit stop position, angularly spaced therebetween. The first limit stop defines the normal position of use of the pivoting element of the armrest 1, as shown in FIGS. 5 and 11.

In particular, in the specific case wherein the apparatus 1 is an armrest of a vehicle, the support structure 2 is either intended to be rigidly connected to the vehicle or may be slidably connected to the vehicle to allow the armrest to translate horizontally.

In particular, as shown in the attached Figures, the pivoting element is rotationally hinged to the support structure 2 by means of a rotation pin 10.

According to the aforementioned general embodiment of the invention, the apparatus or armrest 1 comprises:

at least a first stop 4', fixed on the support structure; and
at least one abutment body 5, which is rotationally connected to the pivoting body 3 and to the support structure 2 around the first axis X1 and may be constrained in rotation to the pivoting element.

Functionally, the abutment body 5, when constrained to the pivoting element 3, stops the pivoting element in the first limit stop position abutting against the first stop 4' as illustrated in FIGS. 5 and 11.

Preferably, the apparatus or armrest 1 comprises at least a second stop 4", fixed on the support structure 2. Such second fixed stop 4" defines the second limit stop position.

Still according to such general embodiment, the apparatus or armrest 1 comprises at least one body 6 of constraint between the abutment body 5 and the pivoting element 3.

Functionally, the aforesaid constraint body 6, 60 may alternatively assume a configuration of constraint, wherein it constrains in rotation the abutment body 5 to the pivoting element 3, and a release configuration, wherein it does not constrain the abutment body 5 to the pivoting element 3.

The apparatus or armrest 1 further comprises a control device 40, which is kinematically connected to the aforesaid at least one constraint body 6, 60 to assume at least two different operating positions, a first one, wherein it brings the constraint body 6, 60 to the constraint configuration, and a second, wherein it brings the constraint body 6 to the release configuration.

In operation, as will be described in more detail hereinafter, the inclination a of the pivoting element in the first limit stop position with respect to a reference plane m passing through the first axis of rotation X1 is adjusted in this manner:

initially, the control device 40 is moved to the second operating release position in such a way that, by varying the inclination angle α of the pivoting element 3, the abutment body 5 is not drawn in motion and the relative position between the pivoting element 3 and the abutment body 5 may be varied and thus the angular position of the first limit stop position in relation to the reference plane m may be changed; and subsequently the control device 40 is returned to the first constraint position once the desired inclination angle α has been reached so as to again lock the abutment body 5 with respect to the pivoting element and to fix the position of the new first limit stop.

Functionally, when the constraint body 6, 60 is in the release configuration, the rotation movement of the pivoting element between the first (adjustable) limit stop and the second limit stop is free in both directions of rotation.

In accordance with the illustrated embodiments in the accompanying Figures, no means or devices are provided to stop the pivoting element in an intermediate position between the two limit stops. In particular, no ratcheting devices or freewheel devices with rolling elements or cams are provided.

Alternatively, the apparatus or armrest 1 may be equipped with means for adjusting the position of the armrest in intermediate positions between the first and second limit stops. In particular, such adjustment means may be constituted by ratchet devices or freewheel devices with rolling elements or cams.

Advantageously, as illustrated in the attached Figures, the apparatus or armrest 1 may comprise two abutment bodies 5, arranged in opposite positions along said first axis of rotation X1, and two corresponding first stops 4', against which the two abutment bodies 5 abut in order to stop the pivoting element in the first limit stop position. In addition, the apparatus 1 comprises a constraint body 6 for each abutment body 5. Such embodiment ensures that the forces in the armrest 1 are distributed evenly, thus guaranteeing superior reliability.

Hereinafter, for simplicity of description, reference will be made (unless otherwise indicated) to a single abutment body. However, the description has also to be extended to the (preferred) case wherein there are two abutment bodies, according to the embodiment specifically illustrated in the accompanying Figures.

In accordance with the preferred embodiment illustrated in the accompanying Figures, the aforementioned at least one abutment body 5 comprises a toothed portion 51 that extends on an arc of circumference concentric to the first axis of rotation X1.

Still in accordance with the preferred embodiment, at least one constraint body consists of a sprocket wheel 6 meshed to the toothed portion 51 of the abutment body 5.

More specifically, the sprocket wheel 6 is rotationally connected to the pivoting element 3 around a second axis of rotation X2. Preferably, such second axis of rotation X2 is parallel to the first axis X1. The apparatus or armrest 1 further comprises means 8, 80 for locking the rotation of the sprocket wheel 6 around the second axis X2.

Operatively, such locking means 8, 80 are activated and deactivated by the control device 40 respectively when the latter is in the first constraint position or in the second release position, so as to prevent or permit respectively the relative movement between the sprocket wheel 6 and the abutment body 5.

More specifically, as illustrated for example in FIGS. 5 and 6 or 8 and 9, in the first constraint position, the locking means 8, 80 are activated to prevent the free rotation of the sprocket wheel 6 and thus to allow the pivoting element 3 to draw the abutment body 5 with it. As the sprocket wheel 6 cannot rotate around the second axis X2, it cannot move freely along the toothed portion 51 of the abutment body (i.e. there is no relative movement between the two parts) and is therefore locked onto the toothed portion 51 of the abutment body 5.

Figure 10:
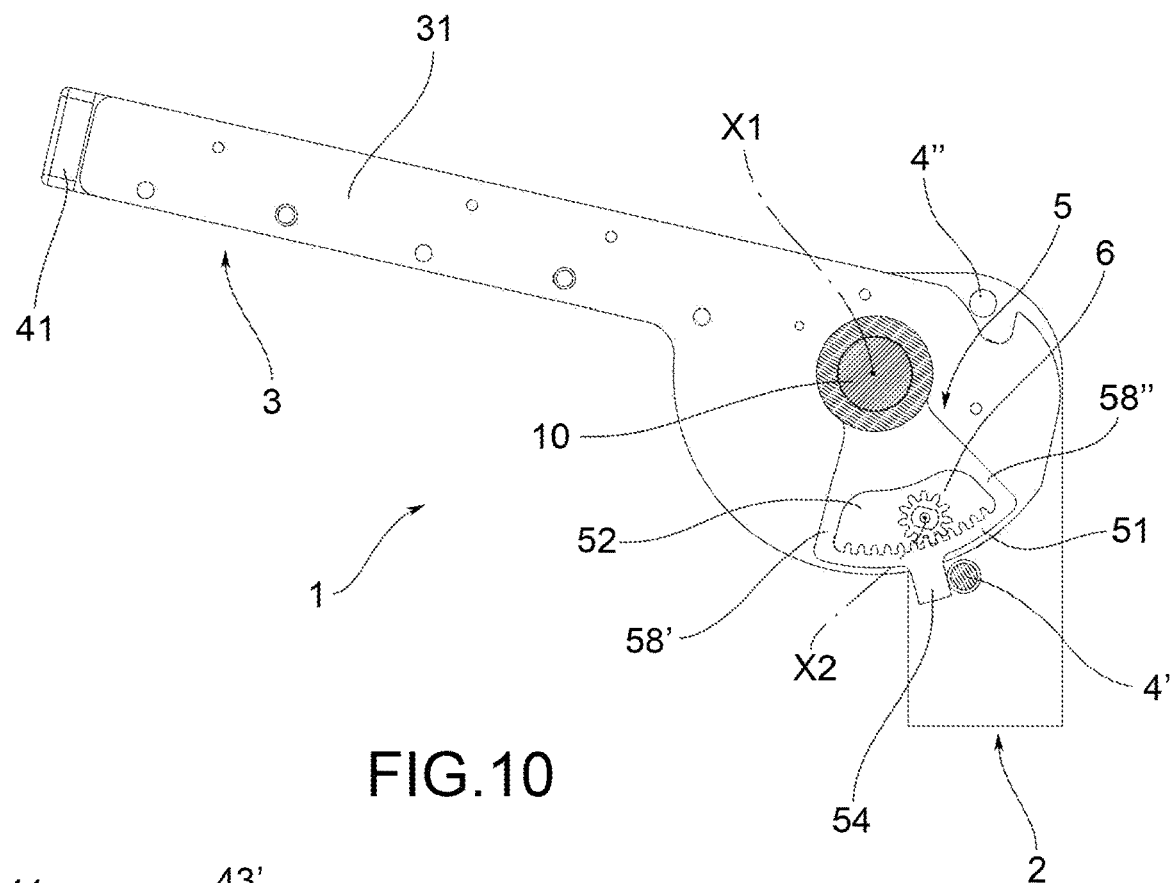
FIGS. 10 and 11 show two side views in cross-section of the apparatus of FIG. 1, respectively according to the planes V-V and VI-VI shown in FIG. 4, illustrated with the pivoting element adjusted to a different first limit stop position and the control device in the release position.

As shown for example in FIGS. 10 and 11, in the second release position, the locking means 8, 80 are deactivated to leave the sprocket wheel 6 free to rotate on itself around the second axis X2. In this case, the sprocket wheel 6, being free to rotate on itself around the second axis X2, may move along the toothed portion 51 of the abutment body 5 (i.e. there is the possibility of relative movement between the two parts). In this way, if the sprocket wheel 6 is drawn in rotation by the pivoting element 3 around the first axis X1, it may move without drawing the abutment body 5 in motion.

Preferably, the toothed portion 51 of the abutment body 5 extends on a circular arc with a defined angular width wherein at the two ends are provided two stop blocks 58' and 58" for the sprocket wheel. As will be clear from the following description, the angular width of such circular arc defines the maximum angular range of adjustment of the pivoting element starting from the first stop 4'.

Figure 2:
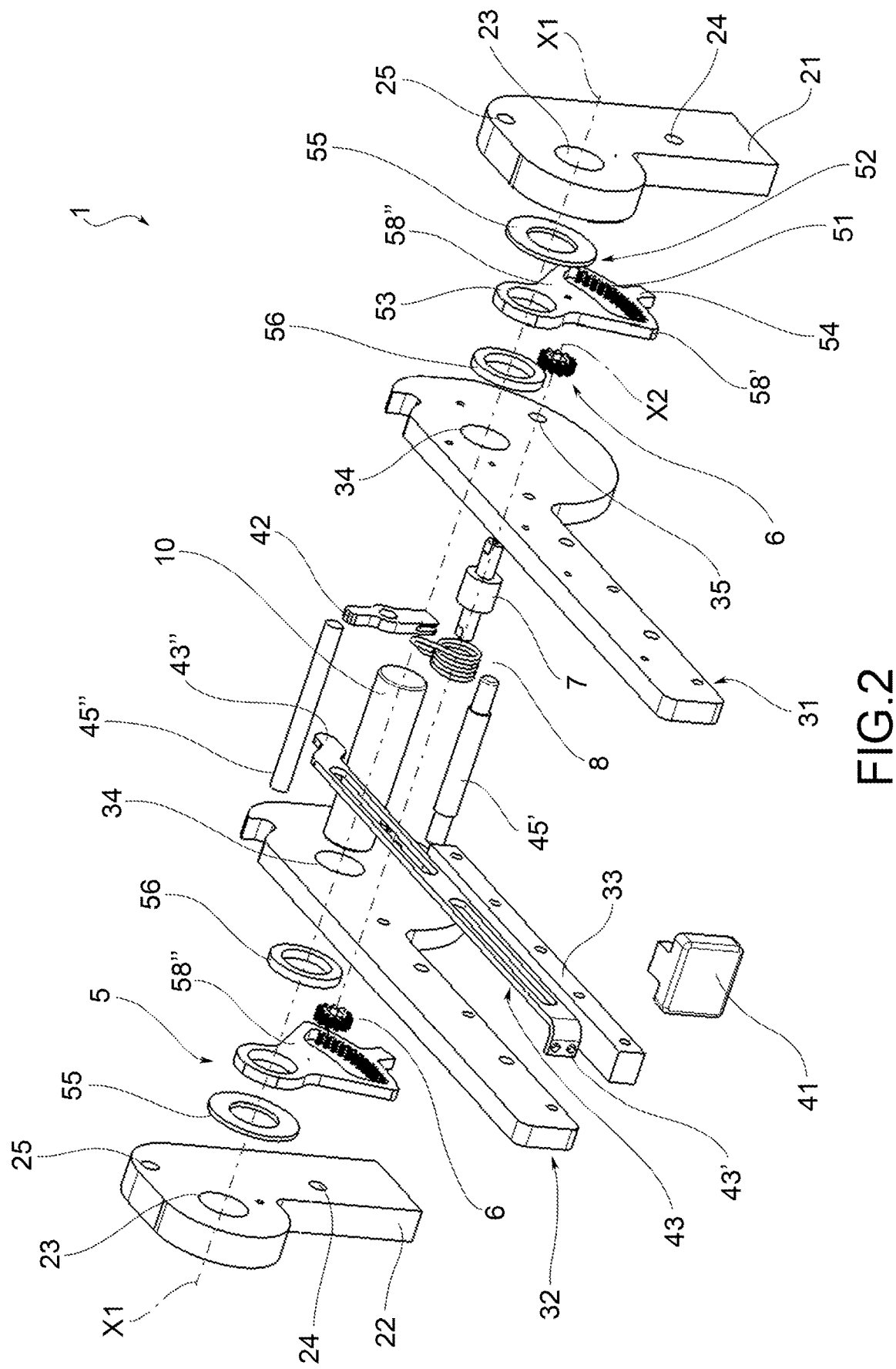
FIG. 2 shows an exploded view of the apparatus of FIG. 1.

In particular, as shown for example in FIGS. 2 and 5, the toothed portion 51 is formed on the edge of an opening 52 made on the abutment body 5. Such opening 52 also serves as the guide seat for the sprocket wheel.

Preferably, the abutment body 5 consists of a plate that is interposed between a portion of the support structure 2 and a portion of the pivoting element 3. In addition to the aforesaid opening with the toothed portion, a hole 53 is made on the plate to connect in rotation the pivoting element to the rotation pin 10. In particular, the plate is equipped with a protruding element 54 designed to engage the first stop 4' in abutment.

Preferably, the sprocket wheel 6 is integral with a support pin 7 which is rotationally connected to the pivoting element 3 around a second axis of rotation X2.

In accordance with a preferred embodiment as shown in the accompanying Figures, the stop means of the sprocket wheel 6 consist of at least one helical spring 8 wound around the aforesaid support pin 7.

Figure 9:
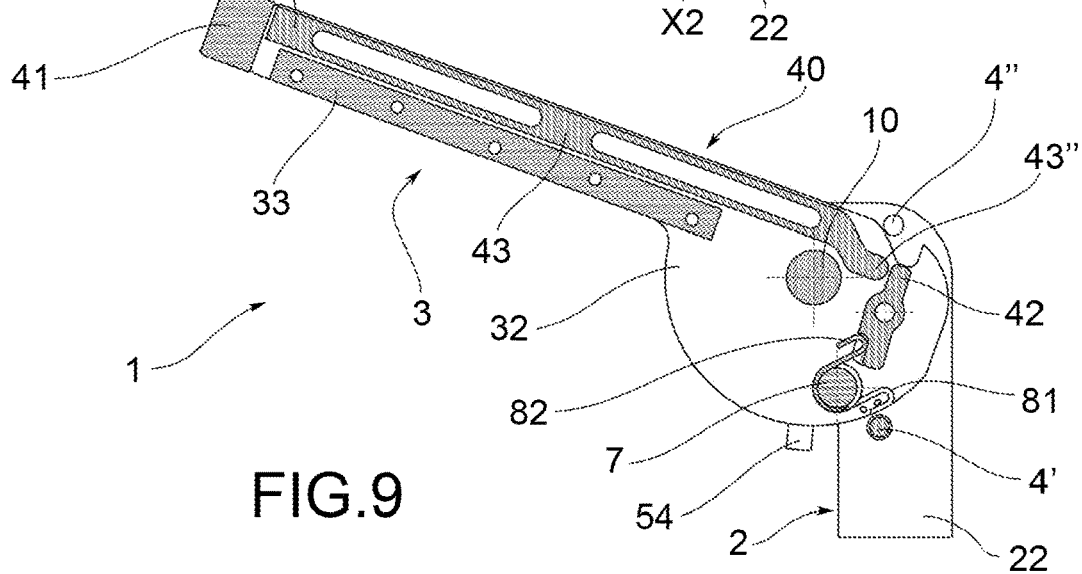
Figure 20:
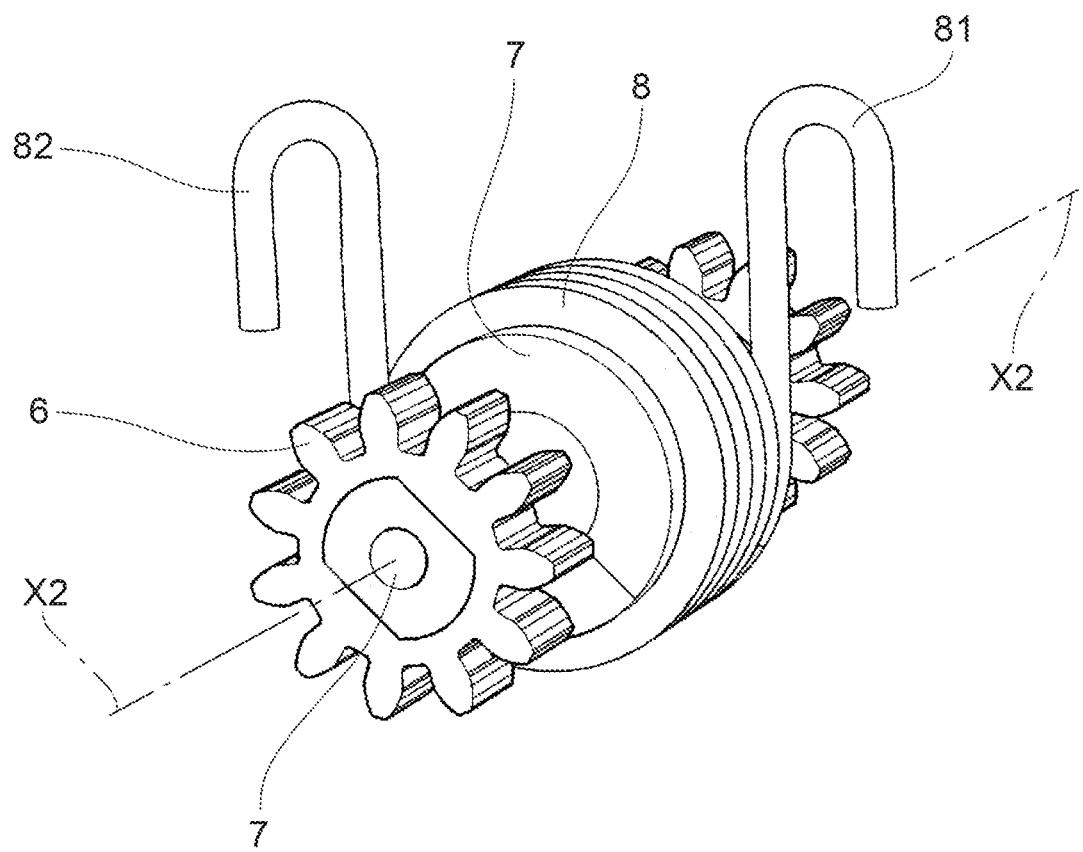
FIG. 20 shows a simplified perspective view of a helical spring wrapped around the support pin of two sprocket wheels.

More in detail, as shown in FIGS. 9, 10 and 20, the helical spring 8 has two free ends arranged relative to the main body of the spring to make the spring work in torsion. A first end 81 is constrained to the pivoting element 3. The second end, 82, however, is kinematically associated with the control device in such a way that, when the control device is in the release position (as illustrated in FIG. 11), such second end 82 is subjected to a force which, by counteracting the elastic force of the spring, loosens the spring's grip on the support pin 7 and frees the rotation of the pin and the associated sprocket wheel 6 on themselves. In this way, a relative movement between the sprocket wheel 6 and the abutment body 5 is made possible.

Preferably, between the two ends of the helical spring 8, the end chosen as the first end 81 is that which, if constrained to the pivoting element, in the presence of a load applied to the pivoting element tending to bring such element beyond the first fixed stop 4', prevents the spring from uncoiling, instead causing the same spring to tighten more on the pin as the load increases.

Figure 12:
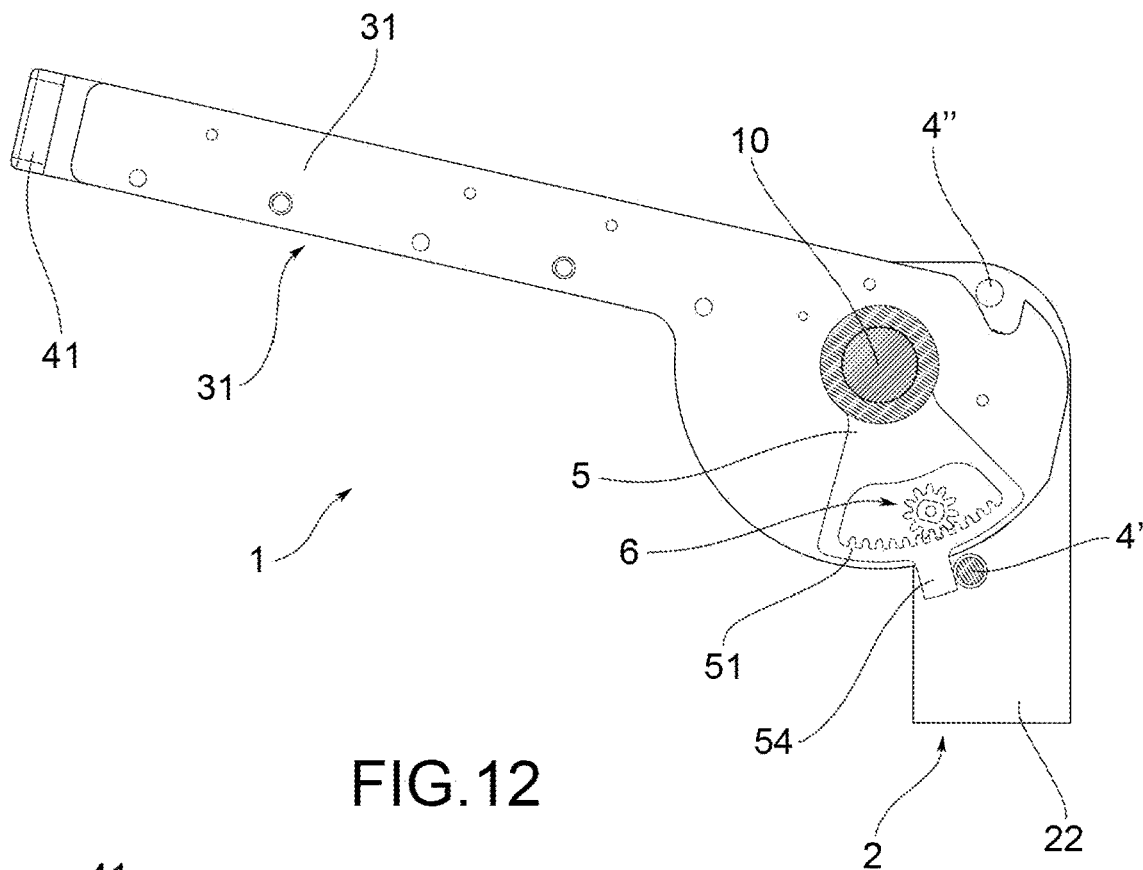
FIGS. 12 and 13 show two side views in cross-section of the apparatus of FIG. 1, respectively according to the planes V-V and VI-VI shown in FIG. 4, illustrated with the pivoting element adjusted to a different first limit stop position and the control device in the rest position.
Figure 13:
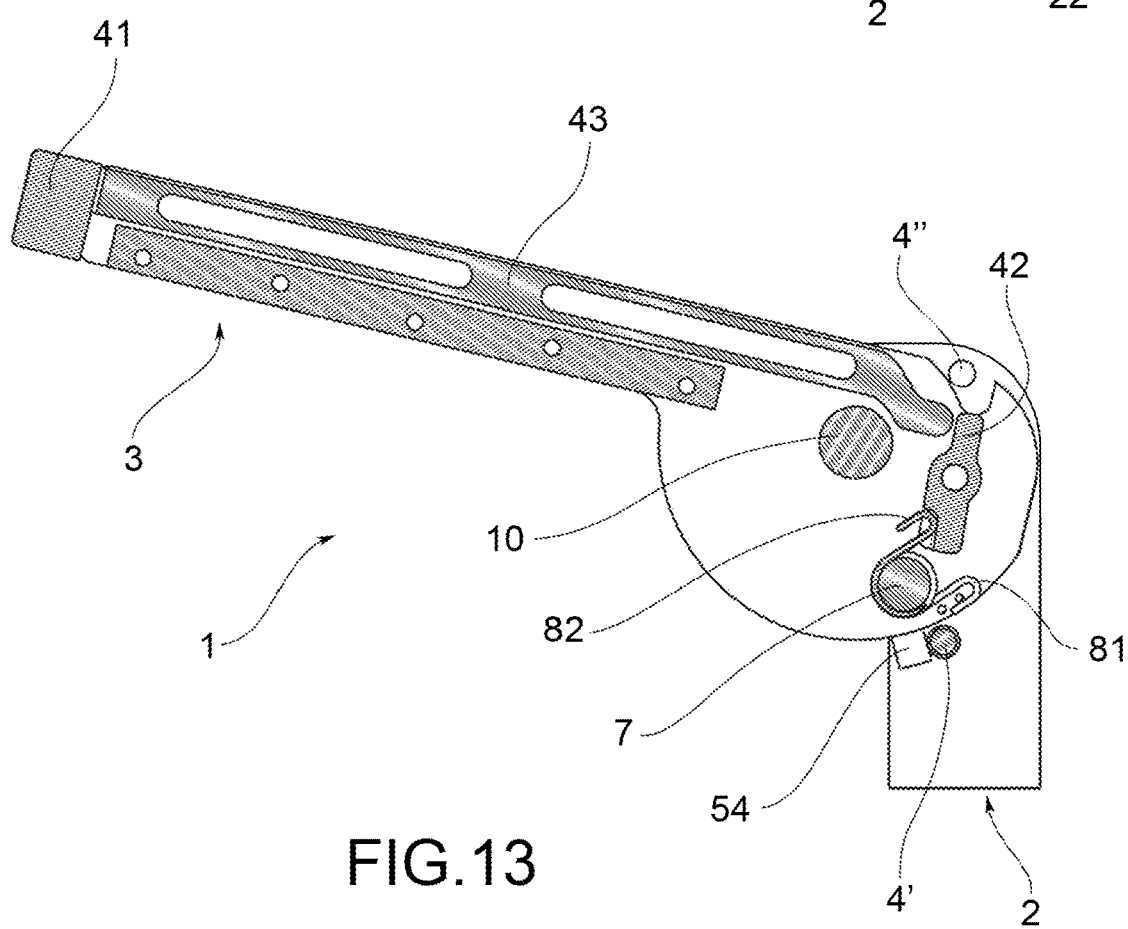

The correct mode of installation of the helical spring 8 may be better understood from FIGS. 12 and 13. By imposing a downward load on the pivoting element (i.e. tending to cause the pivoting element to rotate beyond the first fixed stop 4'; typical in an armrest), the apparatus 1 undergoes a counter-clockwise moment that tends to impose on the support pin 7 a rotation in the same direction. The sprocket wheel thus tends to rotate in the opposite direction, i.e. clockwise. However, such rotation is prevented by the helical spring. As may be seen in FIG. 13, the spring is installed in such a way that a clockwise rotation of the spring would also cause the end fixed to the pivoting element to rotate in the same direction. The presence of the constraint causes the rotation of the sprocket wheel to tighten the spring further. This has the effect that as the load increases (up to the breaking limit of the spring), the tightening of the spring increases and thus the resistance increases as well. An opposite installation (i.e. with constraint on the second end 82) would cause the spring to loosen. There would therefore be a risk of freeing the rotation of the pin and the sprocket wheel.

Figure 22A:
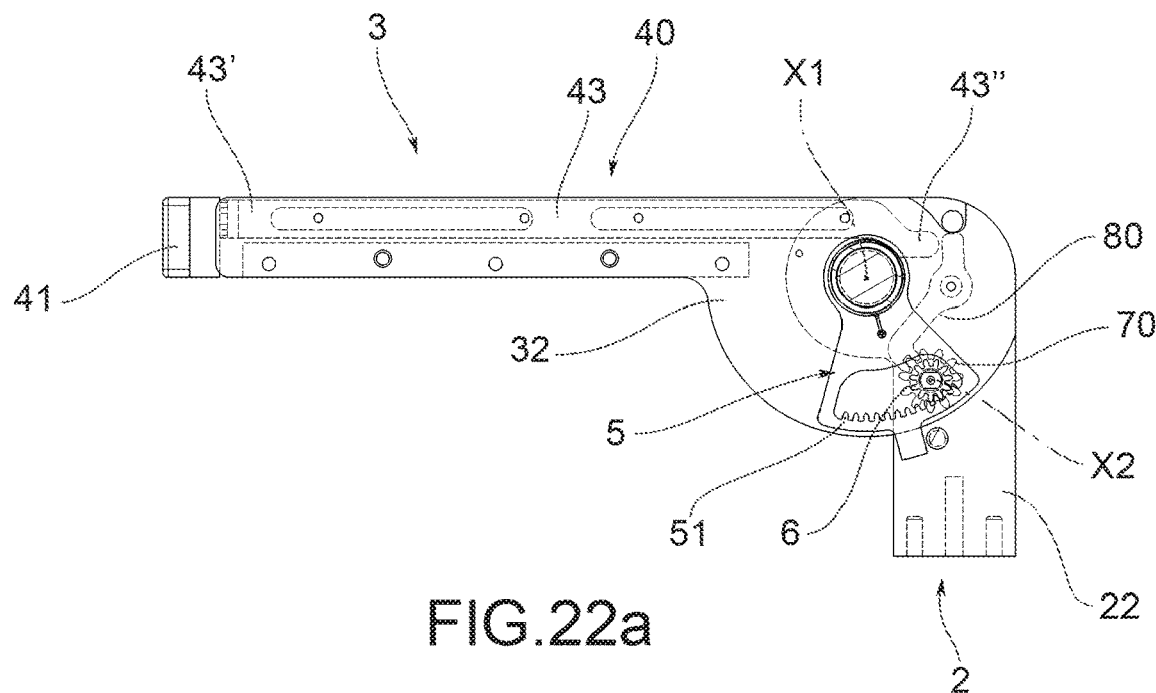
FIG. 22a shows a view in cross-section of an alternative embodiment of the invention wherein the locking means of the support pin of the sprocket wheel are constituted by a movable pawl.
Figure 22B:
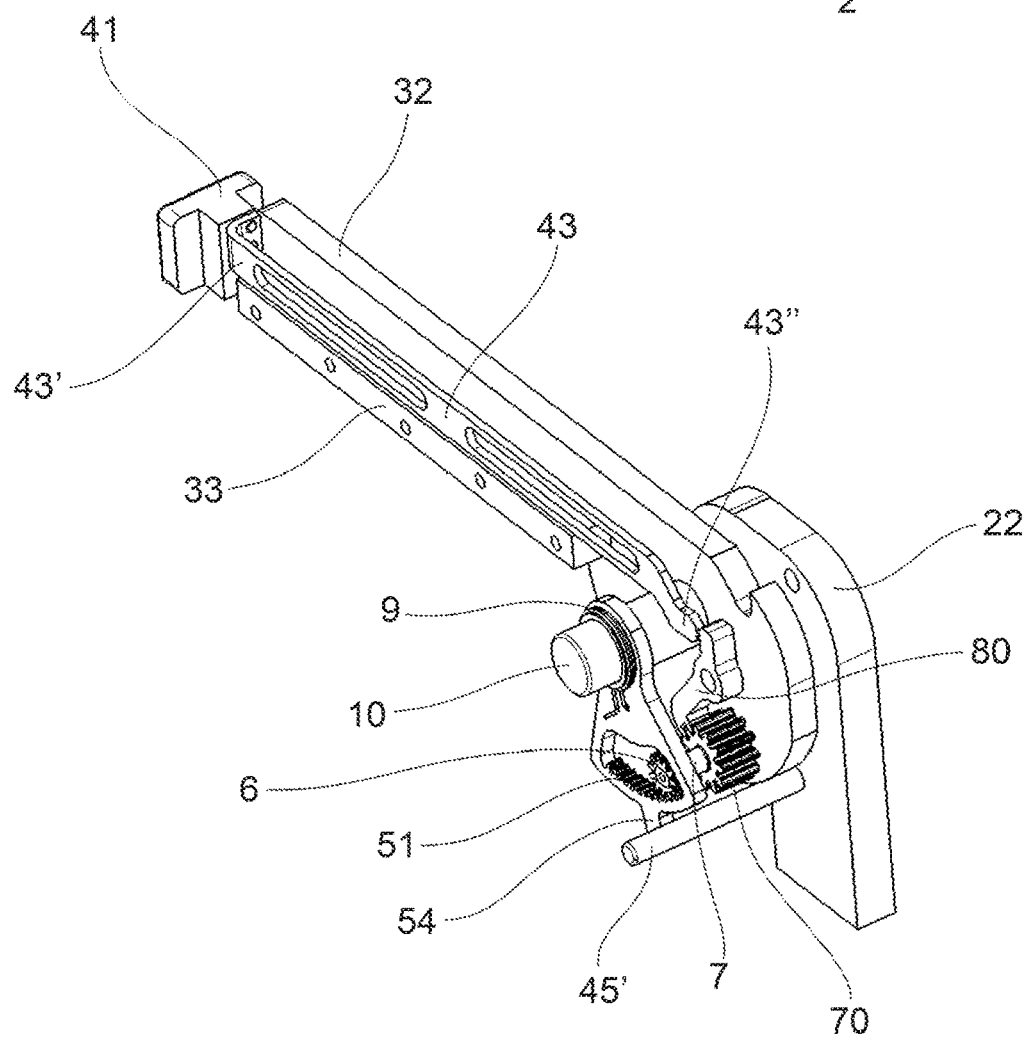
FIG. 22b shows a perspective view of the apparatus of FIG. 22a with some parts removed to better highlight others.

According to an alternative embodiment shown in FIGS. 22a and 22b, the sprocket wheel 6 is integral with a support pin 7, which is rotationally connected to the pivoting element 3 around a second axis of rotation X2. In this alternative embodiment, the locking elements of the sprocket wheel 6 consist of at least one movable pawl 80 and an annular toothed portion 70 formed on the support pin 7. The movable pawl 80 is kinematically associated with the control device 40 so that when the control device is in the constraint position, the movable pawl 80 engages the toothed ring portion 70, locking the rotation of the support pin 7 and the associated sprocket wheel 6 around the second axis X2, and when the control device is in the release position, the movable pawl 80 does not engage the toothed ring portion 70, leaving the support pin 7 and the associated sprocket wheel 6 free to rotate around the second axis X2. In particular, the control device 40 comprises an actuation element 41 and a rod mechanism 42, 43, which will be described hereinafter. The movable pawl 80 is kinematically associated with the drive rod 43.

Advantageously, the use of the helical spring 8 as a locking device instead of the movable pawl 80 just described allows a continuous adjustment of the inclination of the first limit stop. The movable pawl 60, instead, allows only a discontinuous (stepwise) adjustment of the inclination of the first limit stop.

Figure 23A:
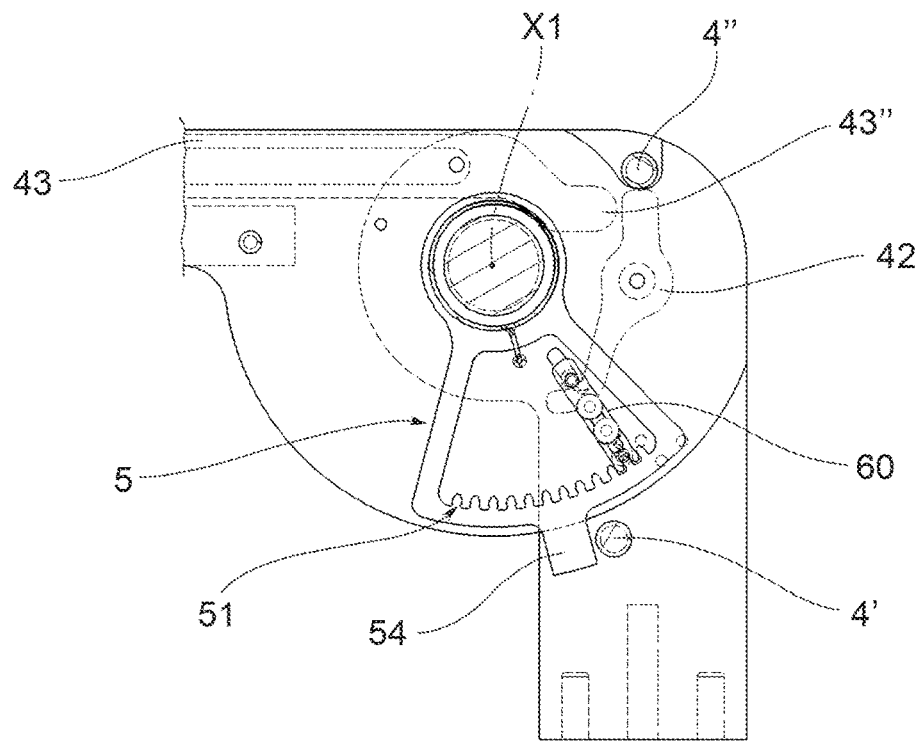
FIG. 23a shows a side view in cross-section of a further alternative embodiment of the invention wherein the constraint body consists of a movable pawl.
Figure 23B:
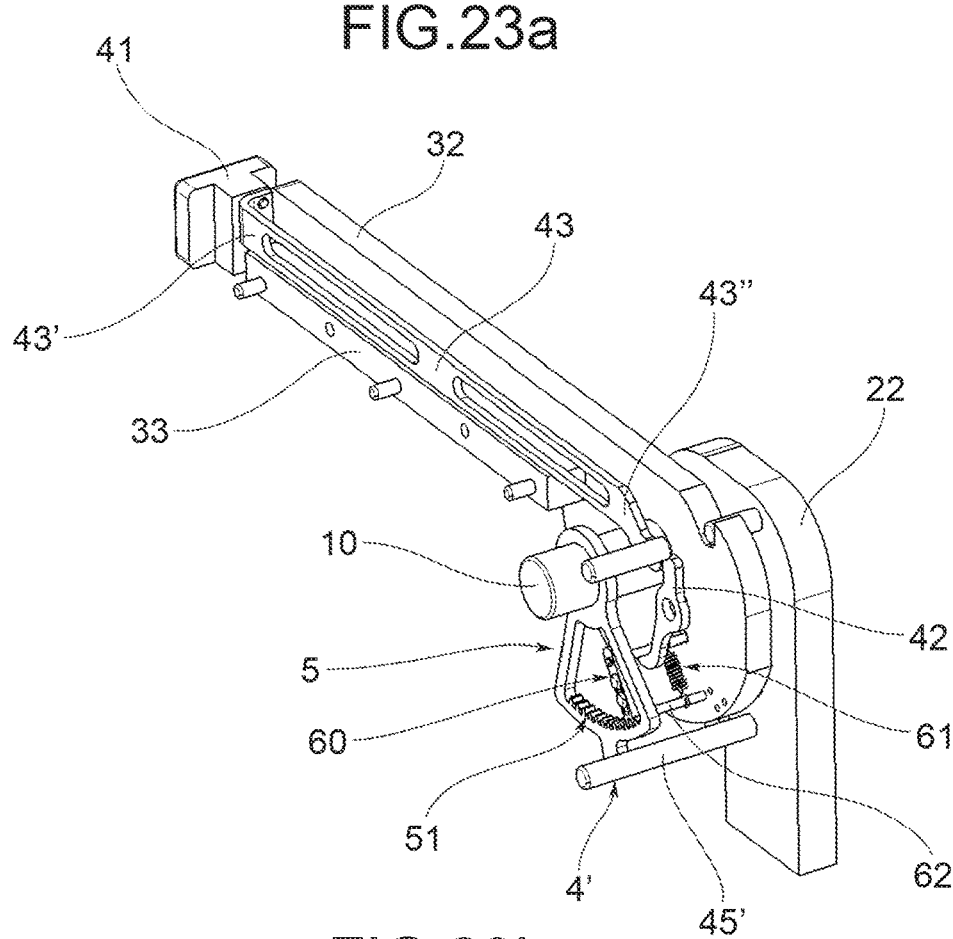
FIG. 23b shows a perspective view of the apparatus of FIG. 23a with some parts removed to better highlight others.

According to another alternative embodiment illustrated in FIGS. 23a and 23b, the aforesaid at least one abutment body 5 (similarly to the embodiments illustrated above) includes a toothed portion 51. Preferably, but not necessarily, this toothed portion 51 extends over an arc of circumference concentric to the first axis of rotation X1. According to such alternative embodiment, the aforementioned at least one constraint body consists of a movable pawl 60 that is integral in rotation to the pivoting element 3 around the first axis X1 (in particular by means of a support pin 62) and is engageable on the toothed portion 51 of the abutment body 5. The movable pawl 60 is kinematically associated with the control device 40 so that when the control device is in the constraint position, the movable pawl 60 engages the toothed portion 51 of the abutment body 5, and when the control device is in the release position, the movable pawl 60 does not engage the toothed portion 51 of the abutment body 5. In particular, the control device 40 comprises an actuation element 41 and a rod mechanism 42, 43, which will be described hereinafter. The movable pawl 60 is kinematically associated with the actuator element 42. Preferably, the movable pawl 60 is maintained in the position of engagement on the toothed portion 51 by means of an elastic element 61, as illustrated in particular in FIG. 23b).

Advantageously, as already mentioned, the embodiment, which comprises a sprocket wheel 6 as the constraint body (with helical spring as the locking device), allows a continuous adjustment of the inclination of the first limit stop. On the other hand, the embodiment, which comprises a movable pawl 60 as the constraint body, allows only a discontinuous (stepwise) adjustment of the inclination of the first limit stop.

Advantageously, the control device 40 comprises:

an actuation element 41 which may be moved between at least two different positions, corresponding respectively to the first constraint position and the second release position, and means 42, 43 for kinematically connecting the actuation element to the aforesaid at least one constraint body 5.

According to the preferred embodiment illustrated in the accompanying Figures, the aforesaid kinematic connection devices 42 and 43 of the control device 40 connect the actuation element to the locking means 8, 80. Alternatively, such kinematic connecting means may connect the actuation element directly to the constraint body 6, 60.

In particular, when the locking means consist of a helical spring 8, the kinematic connection means act on the second end 82 of the helical spring 8 wound around the support pin 7 so that, when the actuation element 41 is moved to the second release position (see FIG. 11), the kinematic connection means apply a force to the second end 82 of the spring, which, by counteracting the spring's elastic force, loosens the spring's grip on the support pin 7 and frees the rotation of the pin and the associated sprocket wheel 6.

Advantageously, as illustrated in the accompanying Figures, the aforesaid kinematic connection means consist of a mechanism. Preferably, such mechanism is a rod mechanism.

In accordance with the embodiment shown in particular in FIGS. 6, 9, 11 and 13, the control device is associated with the pivoting element 3. The actuation element 41 consists of a button or lever, located in a position easily accessible to a user. The mechanism comprises an actuator element 42 which may move between a rest position, wherein it does not interfere with the second end 82 of the helical spring 8 (see FIGS. 6, 9 and 13), and an active position wherein it engages the second end 82 of helical spring 8 (see FIG. 11) to counteract the elastic force thereof and loosen the spring's grip on the support pin 7.

In operation, the movement of the actuator element 42 from the rest position to the active position is determined by the displacement of the actuation element 41 from the constraint position to the release position. The opposite movement, i.e. from the active to the rest position, is left to the counter-thrust of the second end 82 of the helical spring 8.

Advantageously, in order to facilitate the return of the actuator 42 from the active to the rest position, the apparatus or armrest 1 may comprise a return spring (not illustrated) acting between the control device (directly or indirectly on the actuator) and the pivoting element, so that such movement is not referred only to the helical spring 8 wound around the support pin 7.

Preferably, the mechanism comprises at least one drive rod 43 connected at a first end 43' to the actuation element and at a second end 43" to the actuator element 42. The drive mechanism may be more complex and comprise two or more mechanically linked rods.

According to an embodiment not illustrated in the accompanying figures, the actuation element may be connected directly to the actuator element, without any intermediate drive mechanism.

Alternatively, the aforesaid kinematic connection means may be a bowden cable (not illustrated in the Figures).

Preferably, as already mentioned previously, the apparatus or armrest 1 comprises two abutment bodies 5 (preferably identical in structure and operation), and two corresponding first stops 4', against which the two abutment bodies abut to stop the pivoting element in the first limit stop position. Moreover, the apparatus 1 comprises a constraint body 6 for each of the two abutment bodies 5.

The two abutment bodies and the relative constraint bodies are a duplication in terms of structure and operation of the single abutment body and the relative constraint body described previously. The description given previously therefore applies.

In particular, each of the two constraint bodies 6 consists of a sprocket wheel 6 meshed to the toothed portion 51 of the corresponding abutment body 6.

Preferably, the two sprocket wheels 6 are supported by the same support pin 7 on which the aforementioned locking means 8 act, which in particular consist of at least one helical spring 8, as described previously. Advantageously, the second axis of rotation X2, around which the two sprocket wheels 8 and the common support pin 7 rotate, is parallel to the first axis of rotation X1.

According to a first preferred embodiment illustrated in FIGS. 1 to 16, the apparatus or armrest 1 comprises at least one friction element 55 (for example, a ring coaxial to the rotation pin 10 of the pivoting element) arranged between the abutment body 5 and the support structure 2.

In particular, such at least one friction element 55 is sized in such a way that:

when the control device 40 is in the first constraint position, the friction between abutment body 5 and pivoting body 3 is greater than the friction generated between the abutment body 5 and the support structure 2 so that the moving pivoting element draws the abutment body with it, and when the control device 40 is in the second release position, the friction between the abutment body 5 and the pivoting body 3 is less than the friction between the abutment body 5 and the support structure 2, so that the moving pivoting element does not draw the abutment body with it.

Advantageously, the apparatus or armrest 1 may comprise at least one lubricating element 56 arranged between the abutment body 5 and the pivoting element 3. In particular, the lubricating element 56 may consist of a ring made of self-lubricating material, coaxial to the rotation pin 10 of the pivoting element. The reduction of friction between the abutment body and the pivoting element prevents the moving pivoting element from drawing the abutment body with it when the control device is in the second release position.

Referring to FIGS. 14 a-c, 15 a-d and 16 a-c, the operation of the apparatus or armrest 1 in accordance with the aforesaid first preferred embodiment is described hereinafter.

Figure 14A:
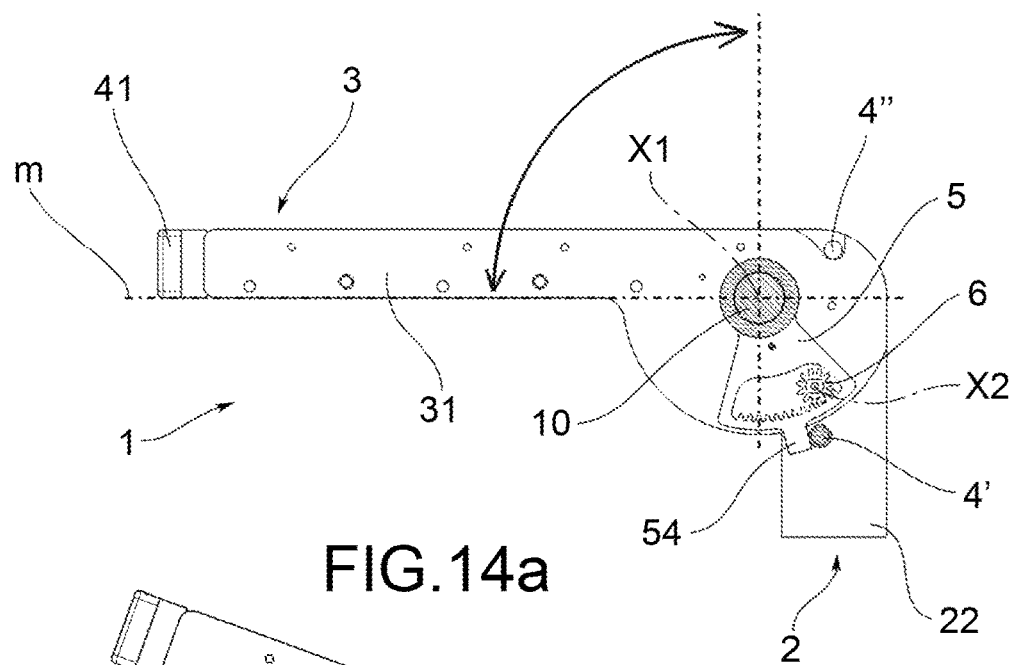
FIGS. 14a to 14c show in sequence, for the apparatus of FIG. 1, the movement of the pivoting element from the first limit stop position without any modification of the inclination of the latter.

FIG. 14a illustrates the device or armrest 1 in the situation of minimum inclination, for example, at an angle of inclination of 0° with respect to a horizontal reference plane m. As can be seen from FIGS. 14 b-c, the pivoting element 3 may be rotated freely until it reaches the second limit stop, the position of which is predefined depending on the use of the same armrest. If the control device 40 is not actuated, the abutment body 5 follows the pivoting element in rotation and the first limit stop position remains unchanged. Therefore, the stable position of the pivoting element (corresponding to that of the first limit stop) remains in the initial first limit stop position.

To adjust the inclination, the control device 40 is used. The actuation element 41 is pressed, bringing it from the constraint position to the release position (see FIG. 15a) so as to deactivate the locking means of the support pin 7 and of the associated sprocket wheel 6. Holding the actuation element 41 in the release position, the pivoting element 3 (see FIG. 15b) is rotated; the sprocket wheel 6 follows the pivoting element in rotation around the first axis X1, sliding along the toothed portion 51 of the abutment body 5; the abutment body 5 remains still, as it is not drawn by the sprocket wheel. The presence of the friction element 55 ensures that the abutment body 5 is not frictionally drawn by the pivoting element and/or the sprocket wheel. Once the desired inclination has been reached (see FIG. 15c), the actuation element 41 is returned to the constraint position; the return movement is automatic due to the action of the elastic force of the helical spring, which pushes on the actuation element 41. The new first limit stop position is now defined; the pivoting element 3 may now stably position itself in the limit stop position with the new inclination angle.

Figure 16A:
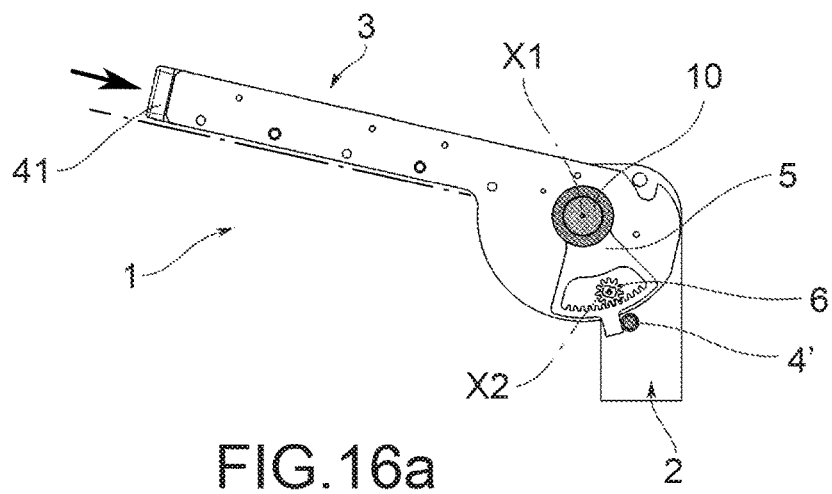
Figure 16B:
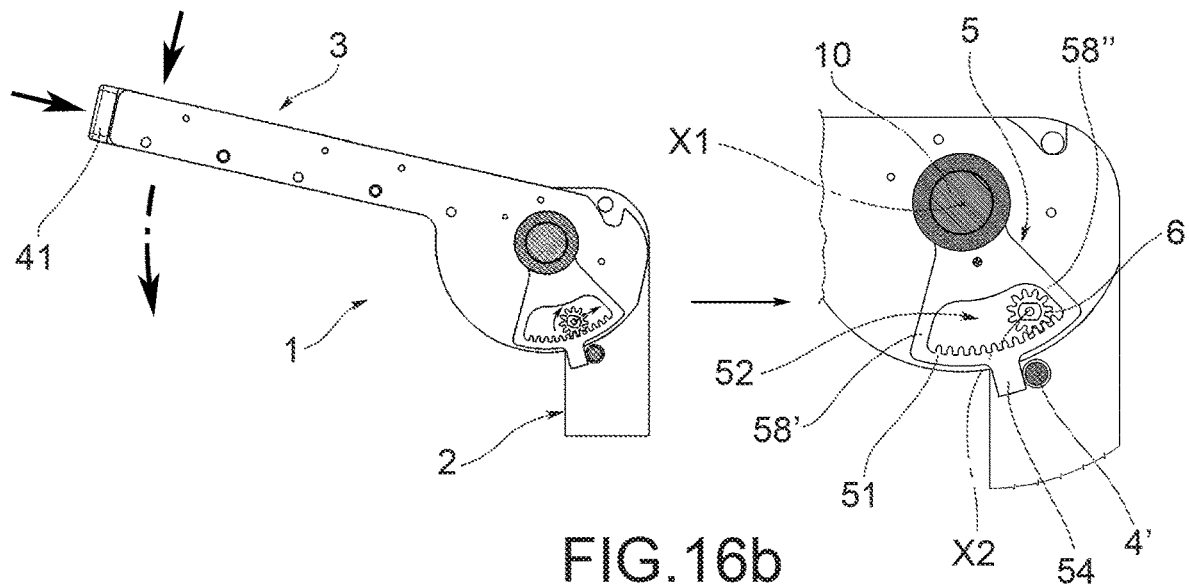
Figure 16C:
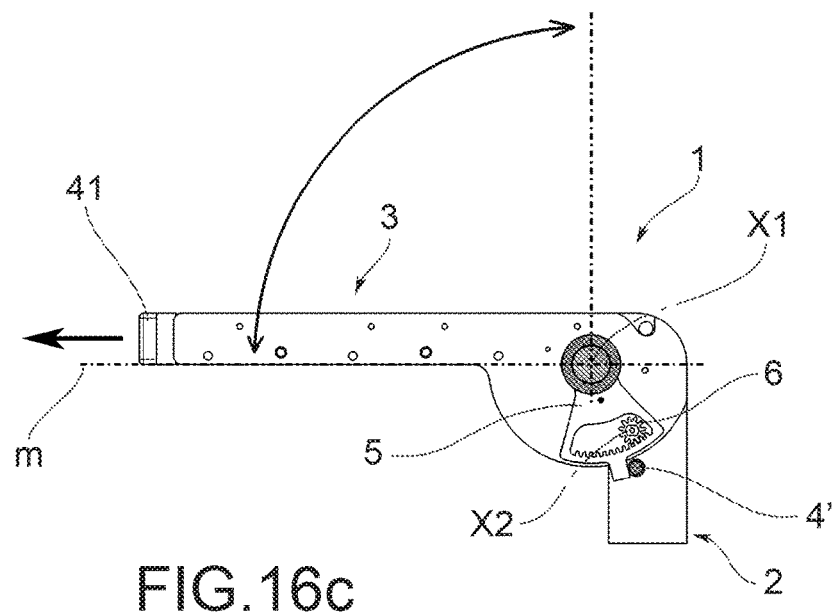
Figure 17:
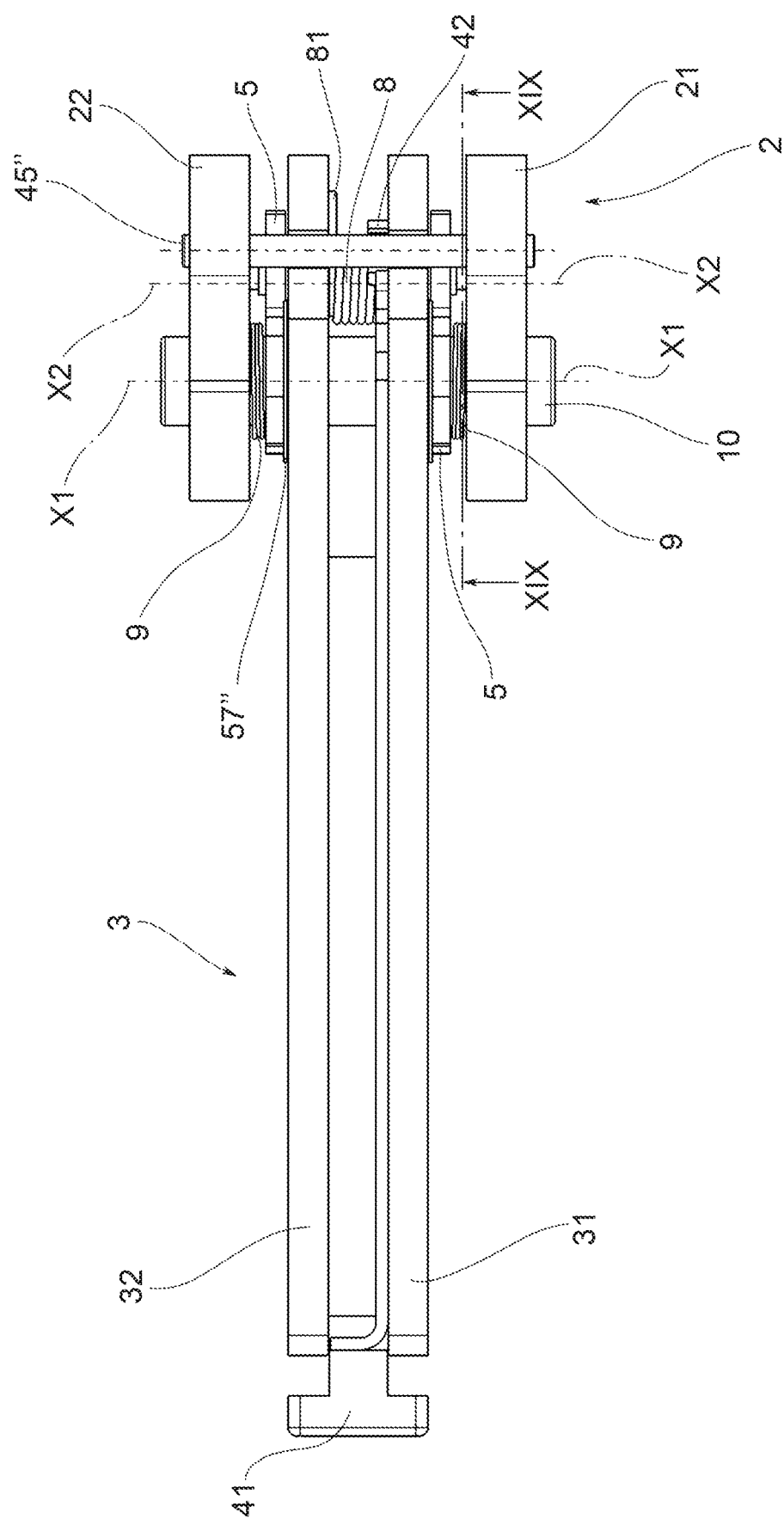
FIG. 17 shows a top view of an apparatus according to a second preferred embodiment of the invention.

To adjust the first limit stop to a different inclination angle α (higher or lower), the operations described above are repeated. FIGS. 16a-16c show the operating steps to bring the first limit stop back to the minimum inclination (for example, 0°).

When adjusting the inclination of the first limit stop position, it is necessary that, while searching for the desired inclination angle (i.e. by moving the pivoting element), the control device 41 is always kept in the release position, so that the abutment body rests on the first fixed stop 4'. If this is not done, the adjustment will be altered.

According to a second preferred embodiment shown in FIGS. 17 to 19 and FIG. 21, the apparatus or armrest 1 comprises means 9, 90 for automatically bringing the abutment body 5 to abut against the first stop 4' when the control device 40 is in the second release position.

Figure 18:
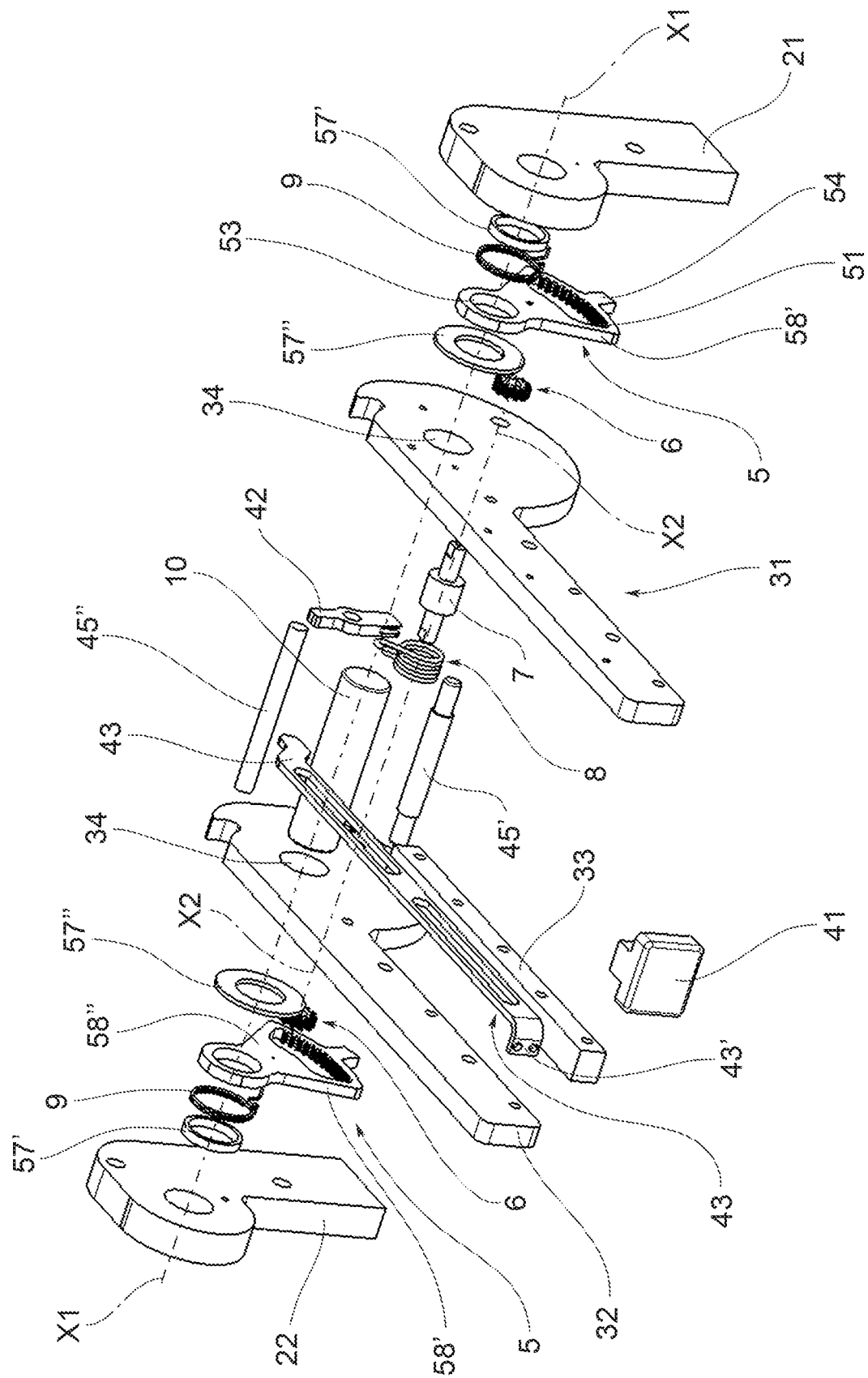
FIG. 18 shows an exploded view of the apparatus of FIG. 17.
Figure 19:
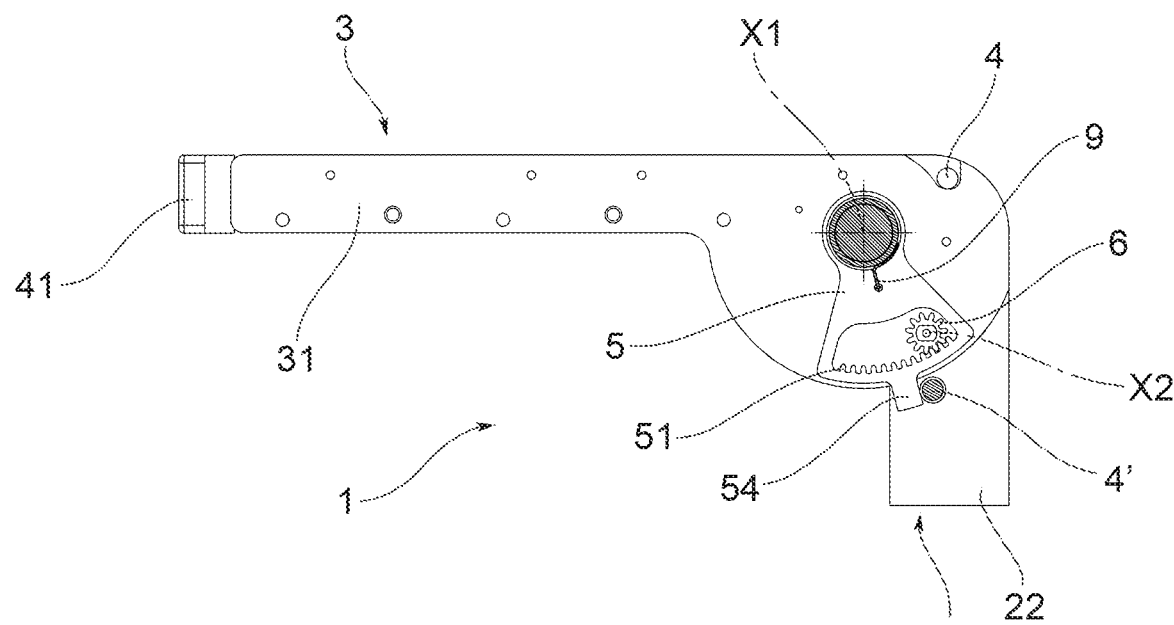
FIG. 19 shows a side view in cross-section of the apparatus of FIG. 17 according to the plane indicated by the arrows XIX-XIX indicated therein.

Preferably, as illustrated in particular in FIGS. 18 and 19, such means for automatically bringing the abutment body 5 in abutment against the first stop 4' comprise at least one elastic element 9 connected to the abutment body 5 and to the fixed structure 2 to exert a moment of rotation that tends to bring the abutment body 5 toward the first stop 4'. In particular, the aforesaid at least one elastic element 9 consists of a helical spring.

Figure 24A:
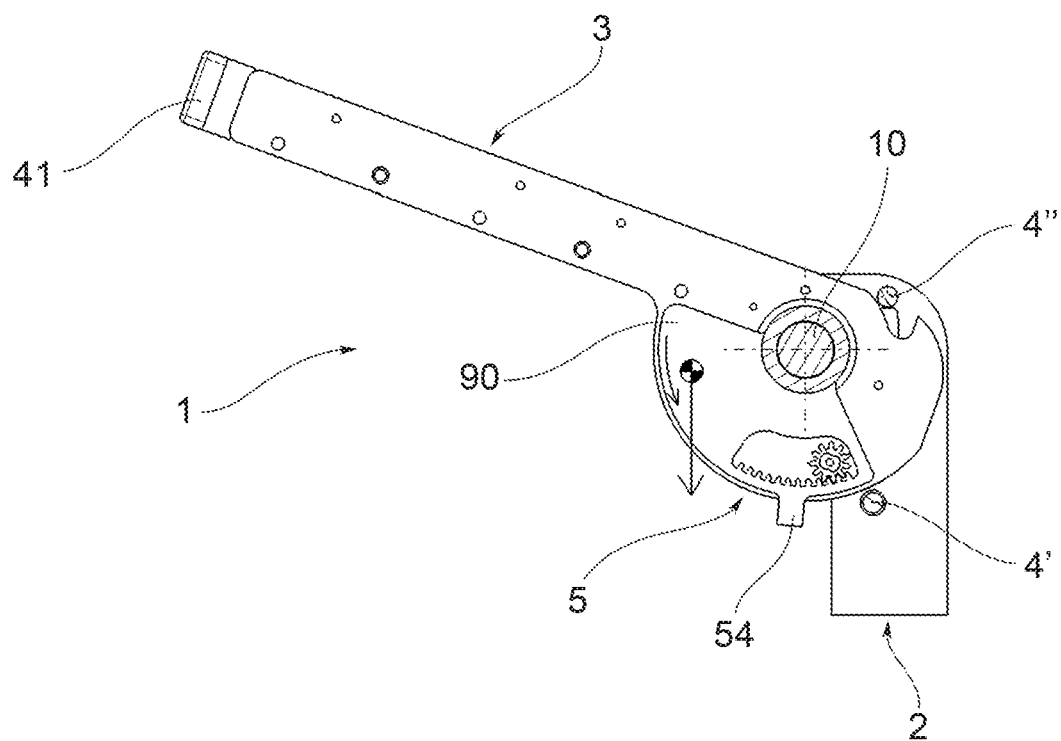
FIGS. 24a and 24b show two views in cross-section of an alternative embodiment of the invention wherein the means for automatically bringing the abutment body against the first stop consisting of a counterweight associated with the abutment body, such means being illustrated in two different operating positions.
Figure 24B:
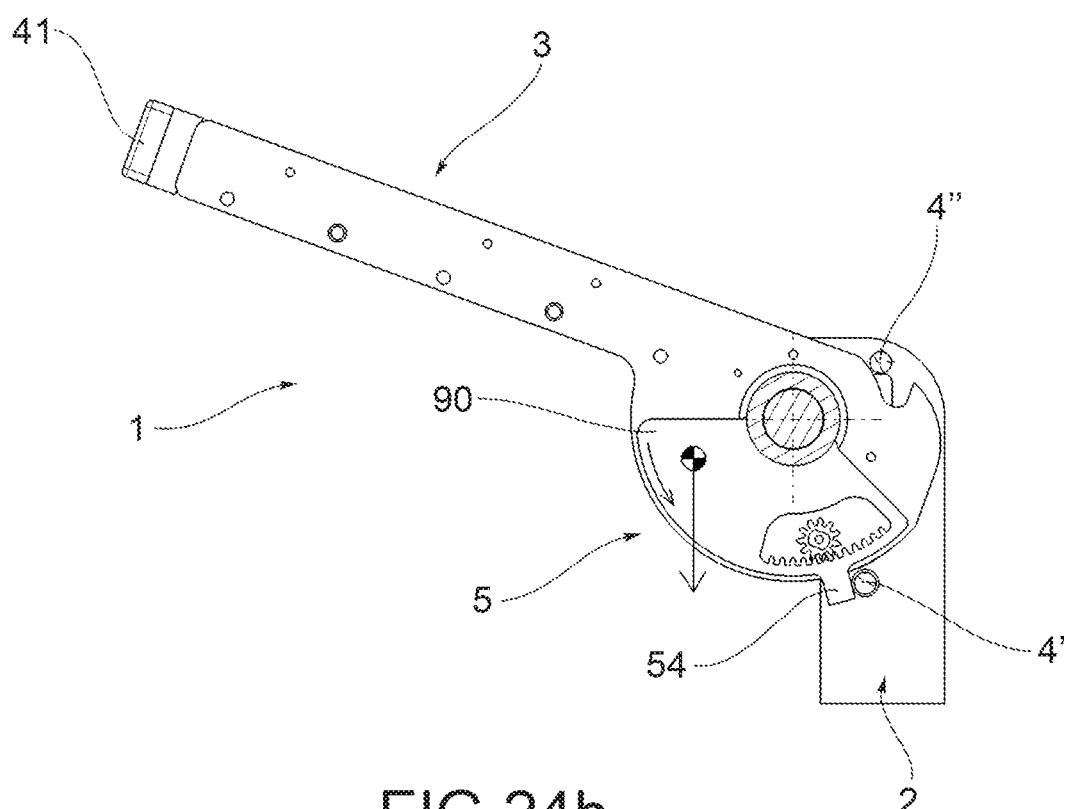

As an alternative to the elastic element 9, as shown in FIGS. 24a and 24b, such means for bringing the abutment body 5 in abutment against the first stop comprise at least one counterweight 90 associated with the abutment body 5. The counterweight 90 is sized and positioned in relation to the first axis of rotation X1 and to the first stop 4' in such a way that, when the control device 40 is in the second release position, the abutment body 5 assumes a stable position only if it rests in abutment against the first stop 4'. In particular, as shown in the Figures, the counterweight 90 consists of an appendage or extension to the abutment body 5

Advantageously, the solution with a counterweight 90 may be combined with the solution with a spring 9.

Advantageously, according to such preferred second embodiment, the apparatus or armrest 1 comprises at least one lubricating element 57' arranged between the abutment body 5 and the support structure 2 and—in combination with or alternatively to—comprises at least one lubricating element 57" arranged between the abutment body 5 and the pivoting element 3.

In particular, the lubricating element 57' or 57" may consist of a ring made of self-lubricating material, coaxial to the rotation pin 10 of the pivoting element. The reduction of friction between the abutment body and the pivoting element/fixed structure acts to prevent the moving pivoting element from drawing the abutment body with it when the control device is in the second release position, obstructing the means 9 for automatically bringing the abutment body 5 in abutment against the first stop 4'.

If the means for automatically bringing the abutment body 5 in abutment against the first stop 4' comprise the spring 9, the first lubricating element 57', preferably in the form of a ring, may advantageously also act as a coaxial support for the spring 9, also reducing friction between the spring 9 and the rotation pin 10.

Preferably, unlike the first preferred embodiment described above, the apparatus or armrest 1 is not equipped with friction elements arranged between the abutment body 5 and the support structure 2/pivoting element 3.

Referring to FIGS. 21 a-d, the preferred operation of the apparatus or armrest 1 in accordance with the aforesaid second preferred embodiment is described hereinafter.

Figure 14B:
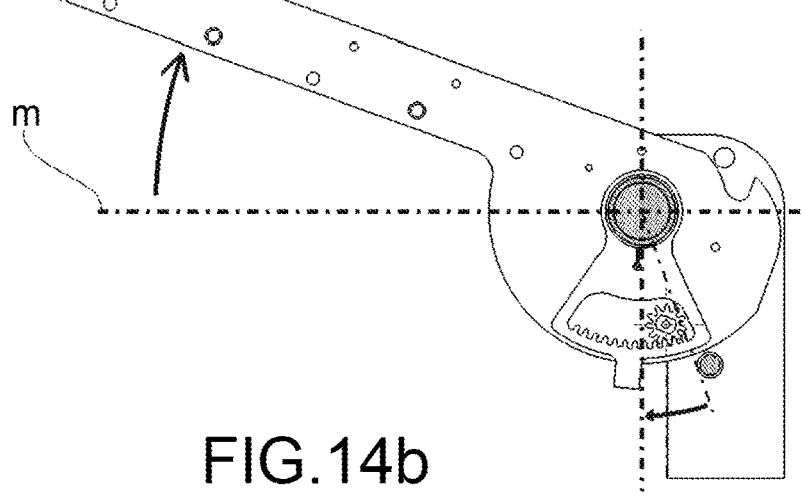
Figure 14C:
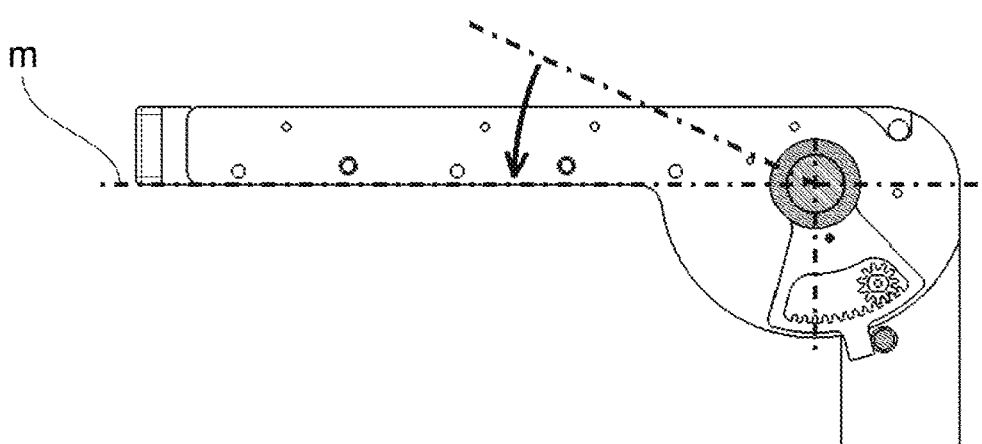

If it is not necessary to change the inclination angle α in the first limit stop position, the operation of the armrest 1 is identical to that described in relation to the first embodiment (see FIGS. 14a-c).

To adjust the inclination, the control device is activated. Unlike in the first embodiment, in the second embodiment it is no longer necessary to keep the control device in the release position while searching for the desired inclination angle α (i.e. by moving the pivoting element). In fact, due to the automatic movement means 9, 90 of the abutment body, the abutment body is automatically brought back in abutment against the fixed stop in any angular position of the pivoting element 3 within the angular range defined by the toothed portion 51 of the abutment body 5. This makes the apparatus or armrest 1 even easier to use.

More specifically, the adjustment is done in the following way. The pivoting element is rotated until the desired inclination angle α for the first limit stop is determined (see FIG. 21a). The abutment body 5 has followed the pivoting element 3 in rotation, as it is constrained by the sprocket wheel 6. At this point, the actuation element 41 is pressed, bringing it from the constraint position to the release position (see FIG. 21b), in order to deactivate the locking means of the support pin 7 and the associated sprocket wheel 6. The means 9, 90 for automatically moving the abutment body automatically bring the abutment body 5 in abutment against the first fixed stop 4'. The presence of at least one lubricating element 57' or 57" ensures that the abutment body 5 is not locked by friction on the pivoting element, but rather may move under the action of the automatic means. At this point (see FIG. 21c) the actuation element 41 is returned to the constraint position; the return movement is automatic, due to the action of the elastic force of the first end 81 of the helical spring 8 pushing on the actuation element, and/or due to the action of an additional return spring. The new first position of the limit stop is now defined; the pivoting element 3 may now steadily position itself in the limit stop position with the new inclination angle (see FIG. 21*d*). To adjust the first limit stop to a different inclination angle α (higher or lower), the operations described above are repeated.

Advantageously, the apparatus or armrest 1, made in accordance with the aforesaid second preferred embodiment, may also be made to work in the manner described for the first embodiment. In other words, it is possible to search for the desired inclination angle α (i.e. by moving the pivoting element) while keeping the control device 40 in the release position. In this case, the automatic movement means 9, 90 of the abutment body will continue to act on the same abutment body, keeping it in abutment against the first stop 4'.

Preferably, as already mentioned, the apparatus 1 according to the present invention is an armrest, particularly for vehicles.

Advantageously, as shown in the attached Figures, the pivoting element 3 of the armrest 1 defines an inner space 30 within which are accommodated the mechanism of the control device and the locking means 8 of the support pin of the sprocket wheel 6. The one or two abutment bodies 5 and the corresponding constraint bodies (sprocket wheels 6 or movable pawls 60) are arranged on the outside of the pivoting element 3.

Figure 1:
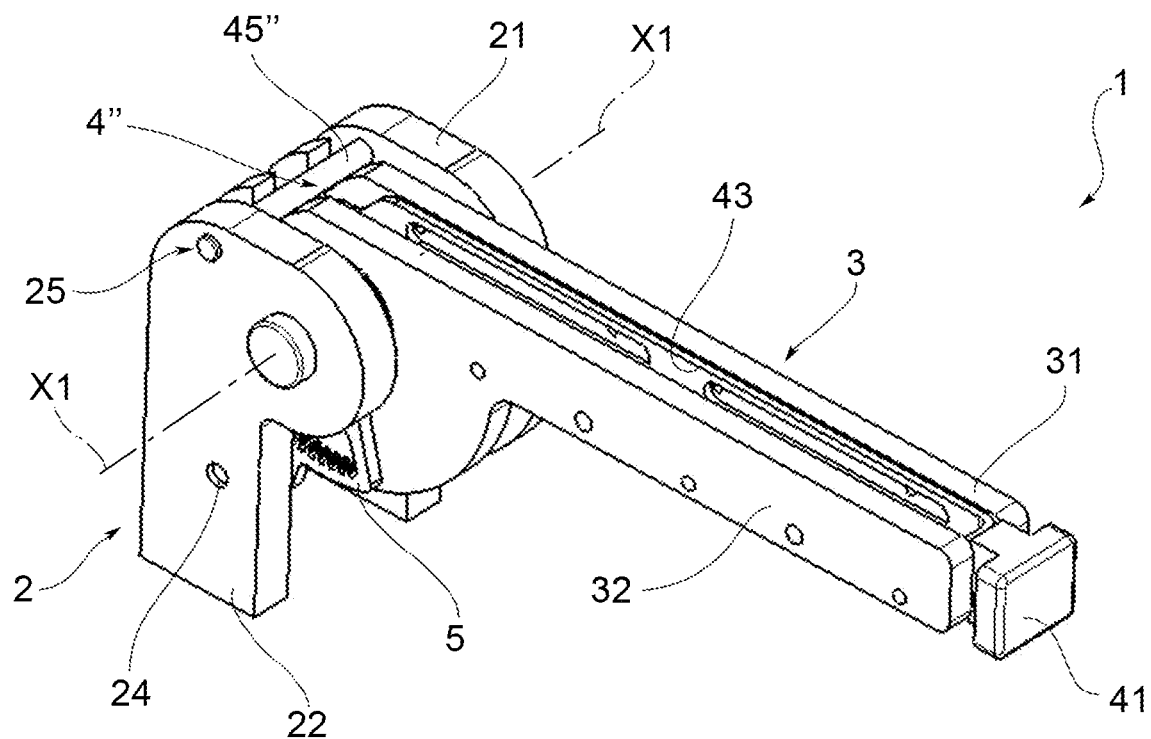
FIG. 1 shows a perspective view of an apparatus according to a first preferred embodiment of the present invention, illustrated with the pivoting element in the first limit stop position with a specific inclination.
Figure 3:
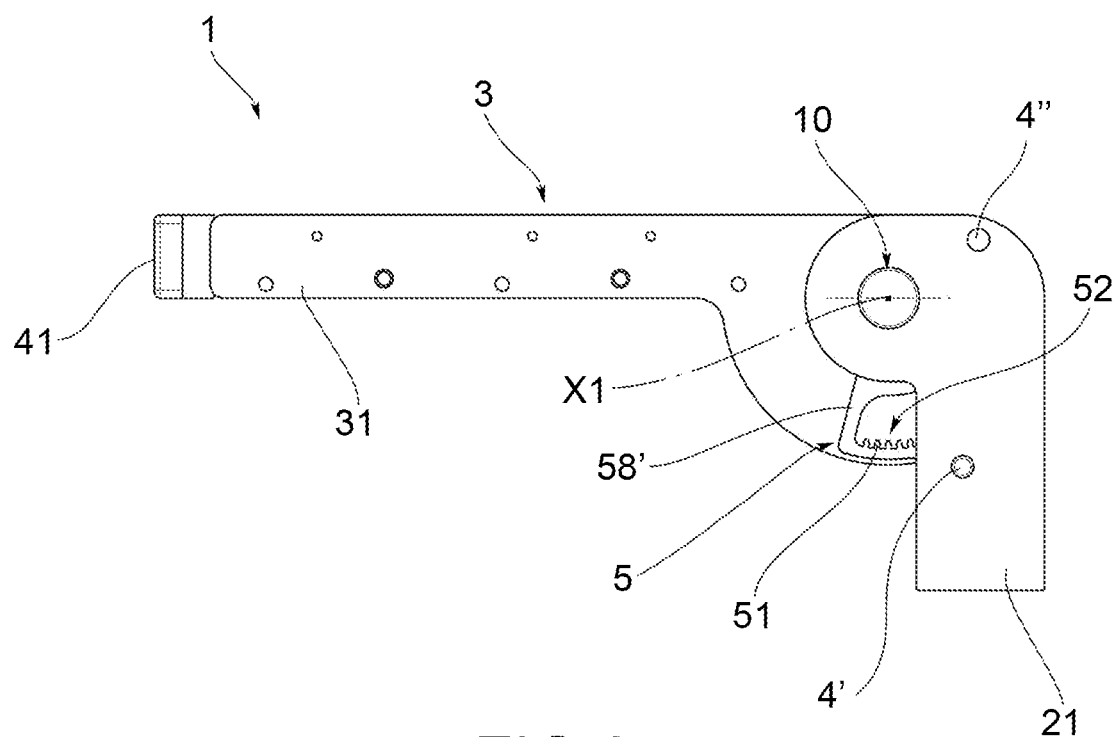
FIGS. 3 and 4 show respectively a side view and a top view of the apparatus of FIG. 1.
Figure 4:
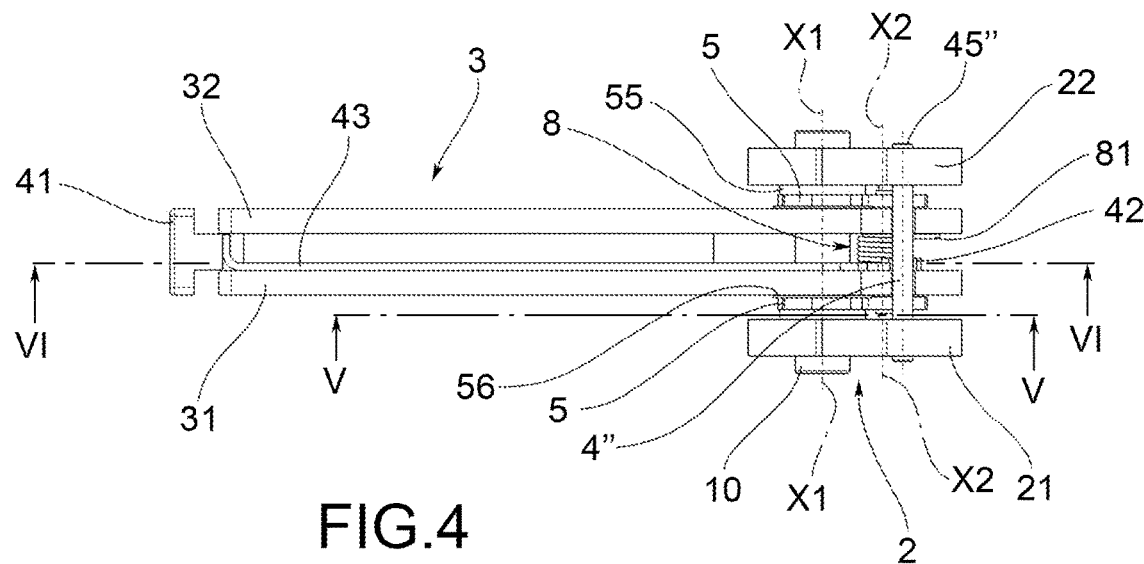

More in detail, as illustrated in particular in FIGS. 1, 2 and 4, the pivoting element 3 of the armrest 1 comprises in particular two plates 31 and 32, shaped according to the longitudinal extension of the armrest. The two plates 31 and 32 are connected to each other by a spacer 33 so as to define the aforementioned inner hollow space 30. The two plates are provided with two first holes 34 aligned along the first axis of rotation X1 through which the rotation pin 10 is inserted. In turn, the rotation pin 10 is supported at its two ends by two uprights 21 and 22 (in particular consisting of plates) belonging to the fixed structure 2.

The two uprights 21 and 22 are provided with two holes 23 aligned along the first axis of rotation X1 for the insertion of the rotation pin 10.

The first and second fixed stops 4' and 4' are defined by two pins 45' and 45" respectively, each of which is rigidly fixed at the two ends thereof to the two uprights 21 and 22 at holes 24 and 25. Such two pins 45' and 45" connect the two uprights 21 and 22, stiffening the support structure 2.

The two plates 31 and 32 of the pivoting element are provided with two second holes 35 aligned along the second axis of rotation X2 where the support pin 7 of the helical spring 8 is rotationally inserted. Such pin 7 is arranged in the inner space 30 between the two plates. The two abutment bodies 5 with the corresponding sprocket wheels 6, as well as any friction or lubricating elements, are interposed between the pivoting element 3 and the two uprights 21 and 22.

The control device 40, and in particular—as illustrated in the attached Figures—the actuator element 42 and the drive rod 43 are arranged in the space between the two plates 31 and 32. The actuation element 41 is arranged in particular at the free end 36 of the pivoting element 3.

The invention allows obtaining many advantages, partially already described.

The apparatus or armrest 1 with inclination-adjustable pivoting element according to the invention makes it possible to automatically reset the pivoting element to a predetermined position without the use of electromechanical devices. The pivoting element may be moved from the first limit stop position, which is adjustable, without losing the position. In other words, the apparatus or armrest 1 allows one to change the limit stop position and store it. All this is done without using electromechanical systems, but rather only by means of a purely mechanical system.

The apparatus or armrest 1 therefore offers speed and simplicity in customizing the first limit stop position of the pivoting element (i.e. the position of use).

The apparatus or armrest 1 also allows for a continuous adjustment of the inclination of the first limit stop. The adjustment is also very silent.

The apparatus or armrest 1 may be combined with inclination adjustment systems of the pivoting element between the first and second limit stop positions using ratcheting devices, freewheel devices with cam or rolling elements or other continuous (stepless) or discontinuous adjustment systems.

Finally, the apparatus or armrest 1 is easy and economical to implement, since the use of particularly complex mechanical components or electromechanical components is not required.

The invention thus conceived therefore achieves the foregoing objects.

Obviously, in its practical implementation, it may also be assumed to take forms and configurations other than those described above without departing from the present scope of protection.

In addition, all details may be replaced by technically equivalent elements, and the dimensions, shapes and materials used may be of any kind according to the need.

What is claimed:

1. An apparatus with an inclination-adjustable pivoting element, the apparatus comprising:
    a support structure,
    a pivoting element hinged to the support structure about a first axis of rotation to move between a first limit stop position and a second limit stop position, said first limit stop position defining the position of use of the pivoting element;
    at least one first stop, fixed on the support structure;
    at least one abutment body rotationally connected to the pivoting element and to the support structure about the first axis and constrainable in rotation to the pivoting element, wherein said abutment body, when constrained to the pivoting element, stops the pivoting element in the first limit stop position by abutting against the first stop;
    at least one constraint body, said constraint body being able to assume
        a constraint configuration, wherein it constrains in rotation the abutment body to the pivoting element, and
        a release configuration, wherein it does not constrain the abutment body to the pivoting element;
    a control device kinematically connected to the at least one constraint body and having at least
        a first operating position, wherein it brings the constraint body to the constraint configuration, and
        a second operating position, wherein it brings the constraint body to the release configuration;
    wherein an inclination of the pivoting element in the first limit stop position may be adjusted by:
        (1) bringing the control device into the second operating position such that, by varying the inclination of the pivoting element, the abutment body is not drawn in motion and the relative position between the pivoting element and the abutment body, and thus the position of the first limit stop, may be changed, and (2) returning the control device to the first operating position once a desired inclination has been reached.

2. The apparatus according to claim 1, wherein said at least one abutment body comprises a toothed portion that extends over an arc of circumference concentric to the first axis of rotation; and said at least one constraint body consists of a sprocket wheel meshed on said toothed portion, said sprocket wheel being rotationally connected to the pivoting element about a second axis of rotation, and said apparatus further comprises means for locking the rotation of the sprocket wheel around the second axis, said locking means being activated or deactivated by the control device respectively when the control device is in the first operating position or in the second operating position, so as to prevent or permit respectively the relative movement between the sprocket wheel and the abutment body.

3. The apparatus according to claim 2, wherein the sprocket wheel is integral with a support pin which is rotationally connected to the pivoting element about the second axis of rotation; and the locking means consists of at least one helical spring wound around the support pin, said spring having two free ends, the first end being constrained to the pivoting element and the second end being kinematically associated with the control device such that, when the control device is in the second operating position, the second end is subjected to a force which, by counteracting the spring's elastic force, loosens the spring's grip on the support pin and releases the rotation of the pin and associated sprocket wheel.

4. The apparatus according to claim 2, wherein the sprocket wheel is integral with a support pin which is rotationally connected to the pivoting element about the second axis of rotation; and the locking means consists of at least one movable pawl and an annular toothed portion formed on the support pin, said movable pawl being kinematically associated to the control device such that, when the control device is in the first operating position, the movable pawl engages the annular toothed portion, locking the rotation of the support pin and of the sprocket wheel around the second axis, and, when the control device is in the second operating position, the movable pawl does not engage the annular toothed portion, leaving the support pin and the sprocket wheel free to rotate around the second axis.

5. The apparatus according to claim 1, wherein said at least one abutment body comprises a toothed portion; and said at least one constraint body consists of a movable pawl which is integral in rotation with the pivoting element around the first axis and engageable on the toothed portion of the abutment body, the movable pawl being kinematically associated with the control device in such a way that, when the control device is in the first operating position, the movable pawl engages the toothed portion of the abutment body, and when the control device is in the second operating position, the movable pawl does not engage the toothed portion of the abutment body.

6. The apparatus according to claim 1, wherein the control device comprises:

an actuation element movable between at least two different positions, corresponding respectively to the first operating position and the second operating position, and kinematic connection means connecting the actuation element to said at least one constraint body.

7. The apparatus according to claim 6, wherein said kinematic connection means connects the actuation element directly to the constraint body.

8. The apparatus according to claim 1, wherein the apparatus comprises two abutment bodies arranged along said first axis of rotation;

two corresponding first stops, against which the two abutment bodies abut to stop the pivoting element in the first limit stop position; and two constraint bodies, each constraint body being associated with one of the two abutment bodies.

9. The apparatus according to claim 8, wherein each of the two constraint bodies consists of a sprocket wheel meshed to a toothed portion of the corresponding abutment body.

10. The apparatus according to claim 9, wherein the two sprocket wheels are supported by the same support pin.

11. The apparatus according to claim 1, further comprising at least one friction element arranged between the abutment body and the support structure.

12. The apparatus according to claim 11, wherein said at least one friction element is configured such that:

when the control device is in the first operating position, the friction generated between the abutment body and the pivoting element is greater than the friction generated between the abutment body and the support structure so that the pivoting element draws the abutment body with it; and when the control device is in the second operating position, the friction generated between the abutment body and the pivoting element is less than the friction generated between the abutment body and the support structure, so that the pivoting element does not draw the abutment body with it.

13. The apparatus according to claim 11, further comprising at least one lubricating element between the abutment body and the pivoting element.

14. The apparatus according to claim 1, further comprising means for automatically bringing the abutment body into abutment with the first stop when the control device is in the second operating position.

15. The apparatus according to claim 14, wherein the means for bringing the abutment body into abutment against the first stop comprises at least one elastic element configured to exert a moment of rotation which tends to bring the abutment body towards the first stop.

16. The apparatus according to claim 14, wherein the means for bringing the abutment body into abutment with the first stop comprises at least one counterweight associated with the abutment body, said counterweight being sized and positioned with respect to the first axis of rotation and to the first stop such that when the control device is in the second operating position, the abutment body assumes a stable position only if it rests in abutment against the first stop.

17. The apparatus according to claim 14, further comprising at least one lubricating element arranged between the abutment body and the support structure.

18. The apparatus according to claim 1, wherein the apparatus is an armrest.

19. The apparatus according to claim 18, wherein the pivoting element defines an inner space within which a kinematic connecting means of the control device and a locking means are housed, and wherein the abutment body and the constraint body are arranged outside said inner space.

20. The apparatus according to claim 18, wherein the armrest is a vehicle armrest.

* * * * *